United States Patent
Bae

(10) Patent No.: US 11,647,520 B2
(45) Date of Patent: May 9, 2023

(54) MECHANISM FOR CONFIGURING SPAN-BASED PDCCH MONITORING

(71) Applicant: Samsung Electronics Co., Ltd., Suwon-si (KR)

(72) Inventor: Jung Hyun Bae, San Diego, CA (US)

(73) Assignee: SAMSUNG ELECTRONICS CO., LTD.

(*) Notice: Subject to any disclaimer, the term of this patent is extended or adjusted under 35 U.S.C. 154(b) by 177 days.

(21) Appl. No.: 17/308,045

(22) Filed: May 4, 2021

(65) Prior Publication Data

US 2021/0385802 A1 Dec. 9, 2021

Related U.S. Application Data

(60) Provisional application No. 63/034,375, filed on Jun. 3, 2020.

(51) Int. Cl.
*H04W 72/04* (2023.01)
*H04W 72/23* (2023.01)
(Continued)

(52) U.S. Cl.
CPC ............ *H04W 72/23* (2023.01); *H04W 72/51* (2023.01); *H04W 72/0446* (2013.01)

(58) Field of Classification Search
CPC ......... H04W 72/0453; H04W 72/0446; H04W 72/042; H04W 72/048; H04W 72/1263;
(Continued)

(56) References Cited

U.S. PATENT DOCUMENTS

2013/0294318 A1* 11/2013 Amerga .............. H04W 72/005
370/312
2020/0169991 A1 5/2020 Lin et al.
(Continued)

FOREIGN PATENT DOCUMENTS

WO 2016064048 A1 4/2016

OTHER PUBLICATIONS

Huawei (Moderator), "Email discussion/approval [101-e-NR-L1enh-URLLC-PDCCH enhancements-02] on remaining issues on scaling PDCCH monitoring capability", 3GPP TSG RAN WG1 Meeting #101-e, E-meeting, Jun. 5, 2020, 50 pages.

*Primary Examiner* — Wei Zhao
(74) *Attorney, Agent, or Firm* — Renaissance IP Law Group LLP

(57) ABSTRACT

A system and a method are disclosed for receiving downlink control information over a wireless downlink control channel of a wireless network. A transceiver of a device is coupled to a wireless network, and a processing device of the device is coupled to the transceiver and is configured to control the transceiver to transmit to the wireless network a monitoring capability of the device in which the monitoring capability is indicated from multiple capability sets. Each capability set includes at least one (X,Y) pattern in which X is a minimum time separation of symbols of two spans of a time slot and Y is a maximum number of consecutive symbols for each span of the time slot. The processing device is further configured to control the transceiver to receive downlink control information in a capability set selected by the wireless network to send downlink control information to the device.

23 Claims, 8 Drawing Sheets

(51) Int. Cl.
  *H04W 72/51*    (2023.01)
  *H04W 72/0446*  (2023.01)
(58) Field of Classification Search
  CPC ............ H04W 72/1289; H04W 72/044; H04L
       1/1819; H04L 1/1896; H04L 1/181; H04L
                                             1/189
  See application file for complete search history.

(56)             References Cited

U.S. PATENT DOCUMENTS

| | | |
|---|---|---|
| 2020/0329461 A1 | 10/2020 | Yang et al. |
| 2020/0351644 A1* | 11/2020 | Yang ..................... H04W 24/08 |
| 2020/0351681 A1 | 11/2020 | Salah et al. |
| 2021/0029726 A1 | 1/2021 | Papasakellariou |
| 2021/0045105 A1* | 2/2021 | Yoon ..................... H04L 5/0055 |

* cited by examiner

MECHANISM FOR CONFIGURING SPAN-BASED PDCCH MONITORING

CROSS-REFERENCE TO RELATED APPLICATION

This application claims the priority benefit under 35 U.S.C. § 119(e) of U.S. Provisional Application No. 63/034,375, filed on Jun. 3, 2020, the disclosure of which is incorporated herein by reference in its entirety.

TECHNICAL FIELD

The subject matter disclosed herein generally relates to wireless communication systems. More specifically, the subject matter disclosed herein relates to enhancing resource efficiency for communication between a base station and user equipments (UEs).

BACKGROUND

In a cellular system, a user equipment (UE) may monitor a physical downlink control channel (PDCCH) search space (SS) to obtain downlink control information (DCI) that provides control information for a downlink operation performed by the UE. Each time instance of a PDCCH SS may be referred to as a monitoring occasion (MO). In order to improve system latency and flexibility, location of a monitoring occasion may be arbitrary within a slot in the new radio (NR) specification of Release 16 (REL-16) of $3^{rd}$ Generation Partnership Project (3GPP). A slot may include, for example, 14 or 12 orthogonal frequency-division multiplexing (OFDM) symbols. Such flexibility, however, may increase PDCCH monitoring complexity of a UE. UE capability signaling may limit an MO pattern within each slot based on REL-15 of the NR specification. To satisfy a declared UE signaling capability, a network provides a PDCCH SS configuration.

SUMMARY

An example embodiment provides a device that may include a transceiver and a processing device. The transceiver may be coupled to a wireless communication network, and the processing device may be coupled to the transceiver. The processing device may be configured to control the transceiver to transmit to the wireless communication network a monitoring capability of the device in which the monitoring capability may be indicated from multiple capability sets. Each capability set may include at least one at least one (X,Y) pattern in a time slot in a wireless downlink control channel of the wireless communication network in which the time slot comprises multiple spans, X may be a minimum time separation of symbols of two spans of the time slot and Y may be a maximum number of consecutive symbols for each span of the time slot. The processing device may also be configured to control the transceiver to receive downlink control information based on a capability set selected by the wireless communication network to send downlink control information to the device. In one embodiment, controlling the transceiver to receive downlink control information may include controlling the transceiver to receive an explicit indication of which capability set has been selected by the wireless communication network to send downlink control information to the device. Additionally, the multiple capability sets may include predetermined capability sets shared by the device and the wireless communication network prior to the device transmitting the monitoring capability of the device to the wireless communication network. An index corresponds to each respective capability set of the multiple capability sets, and controlling the transceiver to receive the explicit indication of which capability set has been selected may further include controlling the transceiver to receive an index that corresponds to the capability set has been selected by the wireless communication network to send downlink control information to the device. In one embodiment, a bit position in a bit map corresponds to a respective (X,Y) pattern, and controlling the transceiver may further include controlling the transceiver to receive an explicit indication of which capability set has been selected by receiving a bit map comprising an indication of the selected (X,Y) pattern. In another embodiment, the monitoring capability of the device may include a plurality of capability sets in which each capability set indicated by the device may further include a feature that makes the capability set distinguishable from other capability sets indicated by the device, and controlling the transceiver to receive the downlink control information may further include controlling the transceiver to receive an indication of the capability set has been selected by the wireless communication network in which the capability set selected by the wireless communication network may include a feature that makes the capability set distinguishable from other capability sets indicated by the device. In still another embodiment, the monitoring capability of the device may include a set of (X,Y)s that includes a set (X,Y) that is associated with a largest maximum number of $C_{PDCCH}^{max,(X,Y),\mu}$ and $M_{PDCCH}^{max,(X,Y),\mu}$ among the set of (X,Y)s. In yet another embodiment, the device may be a user equipment, and the wireless communication network may be a Fifth Generation (5G) wireless communication network, the monitoring capability may include one of a capability on a per-feature set (per-FS) basis and on a per-feature set per component carrier (per-FSPC) basis, and the monitoring capability of the device may be for ultra-reliable low-latency communications (URLLC).

An example embodiment provides a base station in a wireless communications network that may include a first transceiver and a first processing device. The first processing device may be coupled to the first transceiver and may be configured to control the first transceiver to receive from the wireless communication network a monitoring capability of a device wirelessly coupled to the wireless communication network in which the monitoring capability of the device may be indicated from multiple capability sets. Each capability set may include at least one at least one (X,Y) pattern in a time slot in a wireless downlink control channel of the wireless communication network in which the time slot comprises multiple spans, X may be a minimum time separation of symbols of two spans of the time slot and Y may be a maximum number of consecutive symbols for each span of the time slot. The first processing device may also be configured to control the first transceiver to send an indication to the device in which the indication may include a capability set selected from the monitoring capability of the device. In one embodiment, the first processing device may be further configured to control the first transceiver to send to the device an explicit indication of the capability set selected by the wireless communication network. In another embodiment, the capability sets may include predetermined capability sets shared by the device and the wireless communication network prior to the device transmitting the monitoring capability of the device to the wireless communication network. An index corresponds to each respective capability set of the multiple capability sets, and controlling the first transceiver to send the explicit indication of the capability set has been selected may further include controlling the first transceiver to send an index that corresponds to the capability set has been selected by the wireless communication network to send downlink control information to the device. In another embodiment, a bit position in a bit map corresponds to a respective (X,Y) pattern, and controlling the first transceiver to send the explicit indication of the capability set has been selected further may include controlling the first transceiver to send the bit map in which the (X,Y) pattern selected by the wireless communication network is explicitly indicated. In still another embodiment, the monitoring capability of the device may include a plurality of capability sets in which each capability set indicated by the device may further include a feature that makes the capability set distinguishable from other capability sets indicated by the device, and the indication sent to the device indicates the capability set has been selected by the wireless communication network in which the capability set selected by the wireless communication network may include a feature that makes the capability set distinguishable from other capability sets indicated by the device. In yet another embodiment, the monitoring capability of the device may include a set of (X,Y)s that includes a set (X,Y) that is associated with a largest maximum number of $C_{PDCCH}^{max,(X,Y),\mu}$ and $M_{PDCCH}^{max,(X,Y),\mu}$ among the set of (X,Y)s. In another embodiment, the device may be a user equipment, and the wireless communication network may be a Fifth Generation (5G) wireless communication network, the monitoring capability may include one of a capability on a per-feature set (per-FS) basis and on a per-feature set per component carrier (per-FSPC) basis, and the monitoring capability of the device may be for ultra-reliable low-latency communications (URLLC). In a further embodiment, the base station may be used with a device that may include a second transceiver and a second processing device. The second transceiver may be coupled to a wireless communication network, and the second processing device may be coupled to the second transceiver. The second processing device may be configured to control the second transceiver to transmit to the wireless communication network the monitoring capability of the device, and control the second transceiver to receive downlink control information based on the capability set selected by the wireless communication network to send downlink control information to the device.

An example embodiment provides a method to receive downlink control information over a wireless downlink control channel of a wireless communication network in which the method may include: transmitting, from a device to the wireless communication network, a monitoring capability of the device, the monitoring capability may be indicated from multiple capability sets, and each capability set may include at least one (X,Y) pattern in a time slot in a wireless downlink control channel of the wireless communication network in which the time slot may include multiple spans, X may be a minimum time separation of symbols of two spans of the time slot and Y may be a maximum number of consecutive symbols for each span of the time slot; and receiving, by the device, downlink control information based on a capability set selected by the wireless communication network to send downlink control information to the device. In one embodiment, the method may further include monitoring, by the device, the wireless downlink control channel to receive an explicit indication of which capability set has been selected by the wireless communication network to send downlink control information to the device. In another embodiment, the multiple capability sets may include predetermined capability sets shared by the device and the wireless communication network prior to the device transmitting the monitoring capability of the device to the wireless communication network, an index that corresponds to each respective capability set of the multiple capability sets, and in which receiving the explicit indication of which capability set has been selected may include receiving an index that corresponds to the capability set has been selected by the wireless communication network to send downlink control information to the device. In still another embodiment, a bit position in a bit map corresponds to a respective (X,Y) pattern, and receiving the explicit indication of which capability set has been selected may include receiving the bit map explicitly indicating a selected (X,Y) pattern. In yet another embodiment, the monitoring capability indicated by the device may include multiple capability sets in which each capability set indicated by the device may include a feature set that is distinguishable from feature sets of other capability sets indicated by the device. In another embodiment, the monitoring capability of the device may include a plurality of capability sets in which each capability set indicated by the device may further include a feature that makes the capability set distinguishable from other capability sets indicated by the device, and in which receiving the downlink control information may further include receiving an indication of the capability set that has been selected by the wireless communication network in which the capability set selected by the wireless communication network may include a feature that makes the capability set distinguishable from other capability sets indicated by the device. In one embodiment, the monitoring capability of the device may include a set of (X,Y)s that includes a set (X,Y) that is associated with a largest maximum number of $C_{PDCCH}^{max,(X,Y),\mu}$ and $M_{PDCCH}^{max,(X,Y),\mu}$ among the set of (X,Y)s. In one embodiment, the device may be a user equipment, and the wireless communication network may be a Fifth Generation (5G) wireless communication network, the monitoring capability may include one of a capability on a per-feature set (per-FS) basis and on a per-feature set per component carrier (per-FSPC) basis, and the monitoring capability of the device may be for ultra-reliable low-latency communications (URLLC).

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1:
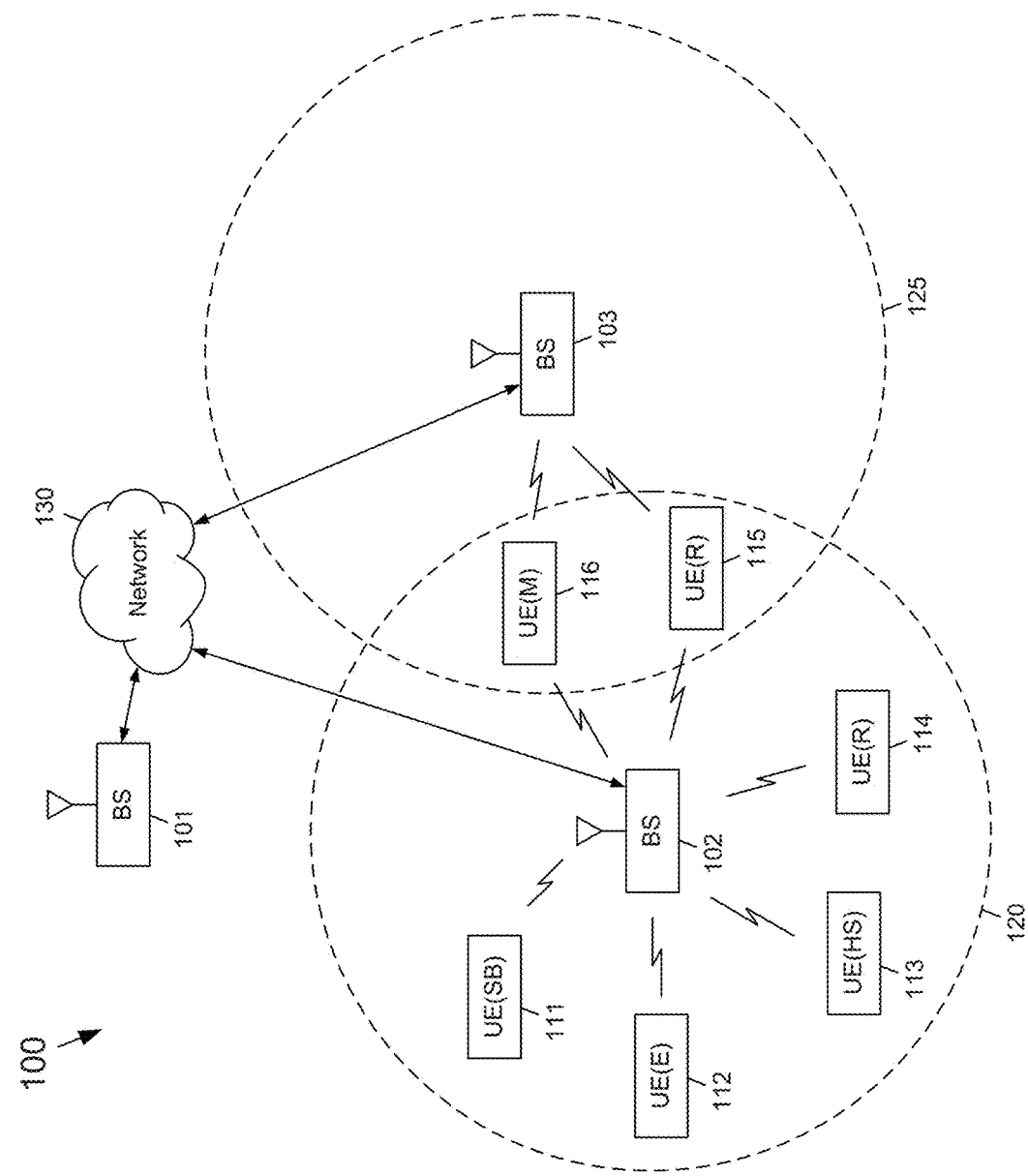
FIG. 1 depicts an example embodiment of a wireless communication network according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

FIGS. 1-7, described below, and the various embodiments used to illustrate the subject matter disclosed herein are only by way of example and should not be construed in any way to limit the scope of the subject matter disclosed herein. It should be understood that the subject matter disclosed herein may be implemented in any suitably arranged system or device.

At least the following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

Figure 2:
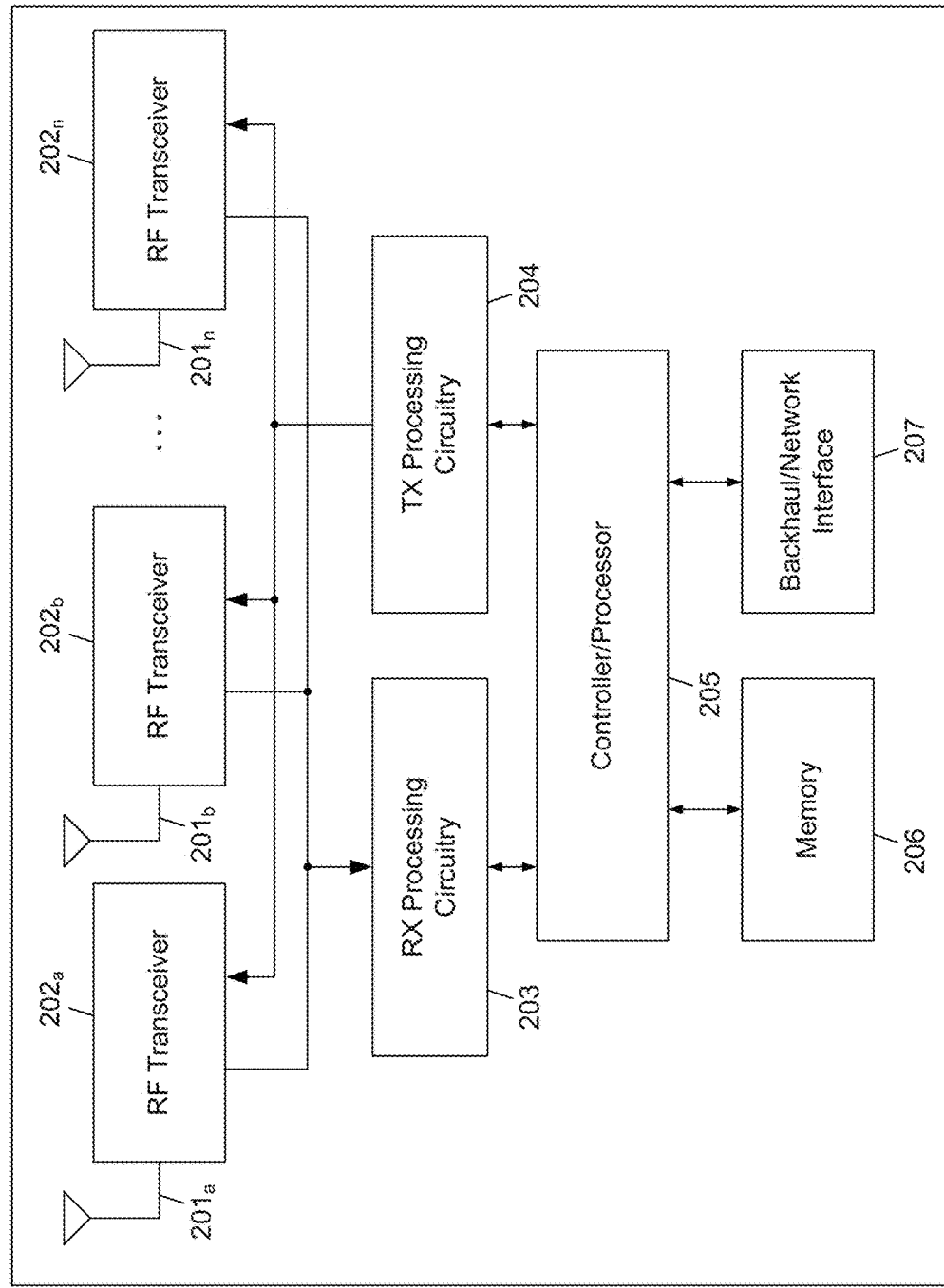
FIG. 2 depicts an example embodiment of a base station according to the subject matter disclosed herein.
Figure 3:
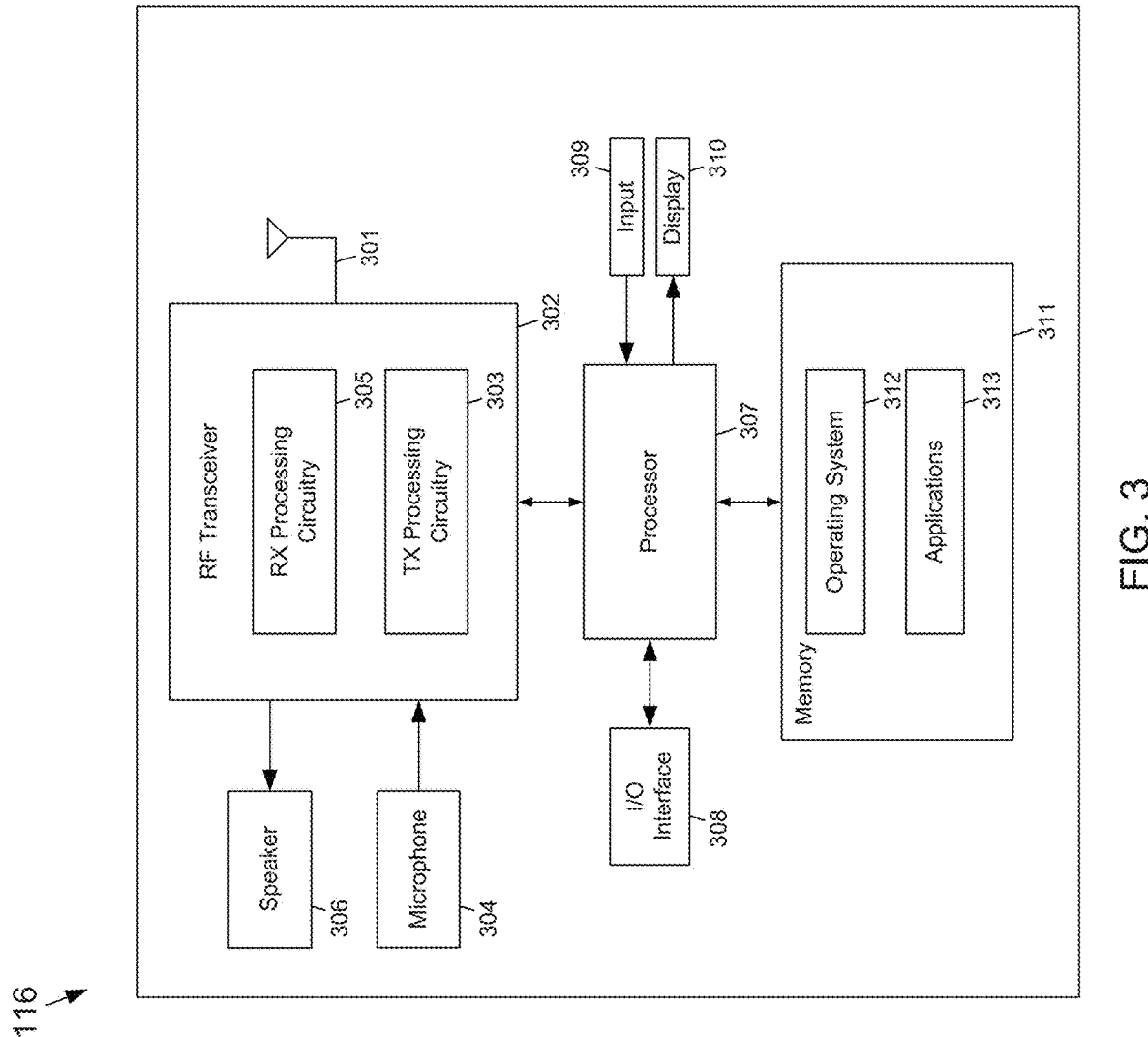
FIG. 3 depicts an example embodiment of UE according to the subject matter disclosed herein.

FIGS. 1-3 depict various example embodiments implemented in wireless communications systems and use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the subject matter disclosed herein may be implemented in any suitably-arranged communications system.

FIG. 1 depicts an example embodiment of a wireless communication network 100 according to the subject matter disclosed herein. The example embodiment of the wireless network depicted in FIG. 1 is for illustration only. Other embodiments of the wireless network 100 may be used without departing from the principles of the subject matter disclosed herein.

As depicted in FIG. 1, the wireless network 100 includes a gNB 101 (e.g., base station, BS), a gNB 102, and a gNB 103. The gNB 101 may communicate with the gNB 102 and the gNB 103. The gNB 101 may also communicate with at least one network 130, such as the internet, a proprietary Internet Protocol (IP) network, or other data network.

The gNB 102 may provide wireless broadband access to the network 130 for a first plurality of UEs within a coverage area 120 of the gNB 102. The first plurality of UEs may include a UE 111 that may be located in a small business (SB); a UE 112 that may be located in an enterprise (E); a UE 113 that may be located in a WiFi hotspot (HS); a UE 114 that may be located in a first residence (R); a UE 115 that may be located in a second residence (R); and a UE 116 that may be a mobile device (M), such as, but not limited to, a cell phone, a wireless laptop, a wireless PDA, or the like. The gNB 103 may provide wireless broadband access to the network 130 for a second plurality of UEs within a coverage area 125 of the gNB 103. The second plurality of UEs may include the UE 115 and the UE 116. In some embodiments, one or more of the gNBs 101-103 may communicate with each other and with the UEs 111-116 using 5G/NR, LTE, LTE-A, WiMAX, WiFi, and/or other wireless communication techniques.

Depending on the network type, the term "base station" or "BS" may refer to any component (or collection of components) configured to provide wireless access to a network, such as a transmit point (TP), a transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably herein to refer to network infrastructure components that provide wireless access to remote terminals. Also, depending on the network type, the term "user equipment" or "UE" may refer to any component such as "mobile station," "subscriber station," "remote terminal," "wireless terminal," "receive point," or "user device." For the sake of convenience, the terms "user equipment" and "UE" may be used herein to refer to remote wireless equipment that wirelessly accesses a BS, whether the UE is a mobile device (such as, but not limited to, a mobile telephone or smartphone) or is normally considered a stationary device (such as, but not limited to, a desktop computer or vending machine).

Dotted lines depict approximate extents of the coverage areas 120 and 125, which are depicted as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 may include circuitry, programming, or a combination thereof, for efficient control signaling designed for improved resource utilization. In certain embodiments, and one or more of the gNBs 101-103 may include circuitry, programming, or a combination thereof, for efficient control signaling designed for improved resource utilization.

Although FIG. 1 depicts one example of a wireless network, various changes may be made to FIG. 1. For example, the wireless network 100 could include any number of gNBs and any number of UEs in any suitable arrangement. Also, the gNB 101 may communicate directly with any number of UEs and provide those UEs with wireless broadband access to the network 130. Similarly, each gNB 102-103 may communicate directly with the network 130 and provide UEs with direct wireless broadband access to the network 130. Further, the gNBs 101, 102, and/or 103 may provide access to other or additional external networks, such as, but not limited to, external telephone networks or other types of data networks.

FIG. 2 depicts an example embodiment of the gNB 102 according to the subject matter disclosed herein. The embodiment of the gNB 102 depicted in FIG. 2 is for illustration only, and the gNBs 101 and 103 of FIG. 1 may have the same or a similar configuration. However, gNBs come in a wide variety of configurations, and it should be understood that FIG. 2 does not limit the scope of the subject matter disclosed herein to any particular implementation of a gNB.

As depicted in FIG. 2, the gNB 102 may include multiple antennas 201a-201n, multiple radio frequency (RF) transceivers 202a-202n, receive (RX) processing circuitry 203, and transmit (TX) processing circuitry 204. The gNB 102 may also include a controller/processor 205, a memory 206, and/or a backhaul or network interface 207.

The RF transceivers 202a-202n may receive incoming RF signals from the antennas 201a-201n. The received RF signals may be signals transmitted by UEs in the network 100. The RF transceivers 202a-202n may down-convert the incoming RF signals to generate IF or baseband signals. The IF or baseband signals may be sent to the RX processing circuitry 203, which generates processed baseband signals by filtering, decoding, and/or digitizing the baseband or IF signals. The RX processing circuitry 203 may transmit the processed baseband signals to the controller/processor 255 for further processing.

The TX processing circuitry 204 may receive analog or digital data (such as, but not limited to, voice data, web data, e-mail, or interactive video game data) from the controller/processor 225. The TX processing circuitry 204 may encode, multiplex, and/or digitize the outgoing baseband data to generate processed baseband or IF signals. The RF transceivers 202a-202n may receive the outgoing processed baseband or IF signals from the TX processing circuitry 204 and may up-convert the baseband or IF signals to RF signals that are transmitted via the antennas 201a-201n.

The controller/processor 205 may include one or more processors or other processing devices that may control the overall operation of the gNB 102. For example, the controller/processor 205 may control the reception of forward channel signals and the transmission of reverse channel signals by the RF transceivers 202a-202n, the RX processing circuitry 203, and the TX processing circuitry 204 in accordance with well-known principles. The controller/processor 205 may support additional functions as well, such as more advanced wireless communication functions. For instance, the controller/processor 205 may support beamforming or directional-routing operations in which outgoing/incoming signals from/to multiple antennas 201a-201n may be weighted differently to effectively steer the outgoing signals in a desired direction. Any of a wide variety of other functions may be supported in the gNB 102 by the controller/processor 205.

The controller/processor 205 may also be capable of executing programs and other processes resident in the memory 206, such as an operating system (OS). The controller/processor 205 may move data into or out of the memory 206, which may be coupled to the controller/processor 205, as required by an executing process. Part of the memory 206 may include a random access memory (RAM), and another part of the memory 206 may include a Flash memory or other read-only memory (ROM).

The controller/processor 205 may also be coupled to the backhaul or network interface 207. The backhaul or network interface 207 may allow the gNB 102 to communicate with other devices or systems over a backhaul connection or over a network. The interface 207 may support communications over any suitable wired or wireless connection(s). For example, when the gNB 102 is implemented as part of a cellular communication system (such as a gNB supporting 5G/NR, LTE, or LTE-A), the interface 207 may allow the gNB 102 to communicate with other gNBs over a wired or wireless backhaul connection. When the gNB 102 is implemented as an access point, the interface 207 may allow the gNB 102 to communicate over a wired or wireless local area network or over a wired or wireless connection to a larger network (such as the internet). The interface 207 may include any suitable structure supporting communications over a wired or wireless connection, such as an Ethernet or an RF transceiver.

Although FIG. 2 depicts one example of gNB 102, various changes may be made to FIG. 2. For example, the gNB 102 may include any number of each component shown in FIG. 2. As a particular example, an access point may include a number of interfaces 207, and the controller/processor 205 may support routing functions to route data between different network addresses. As another particular example, while shown as including a single instance of TX processing circuitry 204 and a single instance of RX processing circuitry 203, the gNB 102 may include multiple instances of each (such as one per RF transceiver). Also, various components in FIG. 2 may be combined, further subdivided, or omitted and additional components may be added according to particular needs.

FIG. 3 depicts an example embodiment of UE 116 according to the subject matter disclosed herein. The embodiment of the UE 116 depicted in FIG. 3 is for illustration only, and the UEs 111-115 of FIG. 1 could have the same or similar configuration. UEs, however, may come in a wide variety of configurations, and FIG. 3 does not limit a UE to be any particular implementation of a UE.

As depicted in FIG. 3, the UE 116 may include an antenna 301, an RF transceiver 302, TX processing circuitry 303, a microphone 304, and RX processing circuitry 305. The UE 116 may also include a speaker 360, a processor 307, an input/output (I/O) interface (IF) 308, a touchscreen 309 (or other input device), a display 310, and a memory 311. The memory 311 may include an OS 312 and one or more applications 313.

The RF transceiver 310 may receive an incoming RF signal, from the antenna 305 that has been transmitted by a gNB of the network 100. The RF transceiver 310 may down-convert the incoming RF signal to generate an intermediate frequency (IF) or baseband signal. The IF or baseband signal may be sent to the RX processing circuitry 325, which generates a processed baseband signal by filtering, decoding, and/or digitizing the baseband or IF signal. The RX processing circuitry 325 may transmit the processed baseband signal to the speaker 330 (such as for voice data) or to the processor 340 for further processing (such as for web browsing data).

The TX processing circuitry 303 may receive analog or digital voice data from the microphone 304 or other outgoing baseband data (such as web data, e-mail, or interactive video game data) from the processor 307. The TX processing circuitry 303 may encode, multiplex, and/or digitize the outgoing baseband data to generate a processed baseband or IF signal. The RF transceiver 302 may receive the outgoing processed baseband or IF signal from the TX processing circuitry 303 and up-convert the baseband or IF signal to an RF signal that is transmitted via the antenna 301.

The processor 307 may include one or more processors or other processing devices and may execute the OS 312 stored in the memory 311 in order to control the overall operation of the UE 116. For example, the processor 307 may control the reception of forward channel signals and the transmission of reverse channel signals by the RF transceiver 302, the TX processing circuitry 303, and the RX processing circuitry 305 in accordance with well-known principles. In some embodiments, the processor 307 may at least one microprocessor or microcontroller.

The processor 370 may also be capable of executing other processes and programs resident in the memory 311, such as processes for beam management. The processor 307 may move data into or out of the memory 311 as required by an executing process. In some embodiments, the processor 307 may be configured to execute the applications 313 based on the OS 361 or in response to signals received from gNBs or from an operator. The processor 307 may also be coupled to the I/O interface 308, which may provide the UE 116 with the ability to connect to other devices, such as, but not limited to, laptop computers and handheld computers. The I/O interface 308 is the communication path between these accessories and the processor 307.

The processor 307 may also be coupled to the touchscreen 309 and the display 310. An operator of the UE 116 may use the touchscreen 309 to enter data into the UE 116. The display 310 may be a liquid crystal display, light emitting diode display, or other display capable of rendering text and/or at least limited graphics, such as from web sites.

The memory 311 may be coupled to the processor 307. Part of the memory 311 may include RAM and another part of the memory 311 may include a Flash memory or other ROM.

Although FIG. 3 depicts one example embodiment of the UE 116, various changes may be made to FIG. 3. For example, various components in FIG. 3 may be combined, further subdivided, or omitted and additional components may be added according to particular needs. As a particular example, the processor 340 may be divided into multiple processors, such as one or more central processing units (CPUs) and one or more graphics processing units (GPUs). Also, while FIG. 3 depicts the UE 116 configured as a mobile telephone or smartphone, UEs may be configured to operate as other types of mobile or stationary devices.

To meet the demand for wireless data traffic that has increased since deployment of 4G communication systems, efforts have been made to develop an improved 5G/NR or pre-5G/NR communication system. Therefore, the 5G/NR or pre-5G/NR communication system may be also referred to as a "beyond 4G network" or a "post LTE system." The 5G/NR communication system may be considered to be implemented in higher frequency (mmWave) bands, e.g., 28 GHz or 60 GHz bands or, in general, above 6 GHz bands, to accomplish higher data rates or in lower frequency bands, such as below 6 GHz, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques as used in 5G/NR communication systems. Additionally, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system may include a downlink (DL) that refers to transmissions from a base station or one or more transmission points to UEs and an uplink (UL) that refers to transmissions from UEs to a base station or to one or more reception points.

A unit for DL signaling or for UL signaling on a cell may be referred to as a slot and may include one or more symbols. A symbol may also serve as an additional time unit. A frequency (or bandwidth (BW)) unit may be referred to as a resource block (RB). One RB may include a number of sub-carriers (SCs). For example, a slot may have duration of 0.5 milliseconds or 1 millisecond, include 14 symbols, and an RB may include 12 SCs with inter-SC spacing of 30 kHz or 15 kHz, respectively. A unit of one RB in frequency and one symbol in time may be referred to as physical RB (PRB).

DL signals may include data signals conveying information content, control signals conveying DL control information (DCI), and reference signals (RS) that may also be known as pilot signals. A gNB transmits data information or DCI through respective physical DL shared channels (PD-SCHs) or physical DL control channels (PDCCHs). A PDSCH or a PDCCH may be transmitted over a variable number of slot symbols including one slot symbol. For brevity, a DCI format scheduling a PDSCH reception by a UE may be referred to as a DL DCI format and a DCI format scheduling a PUSCH transmission from a UE is referred to as an UL DCI format.

A gNB may transmit one or more of multiple types of RS including channel state information RS (CSI-RS) and demodulation RS (DM-RS). A CSI-RS may be primarily intended for UEs to perform measurements and provide channel state information (CSI) to a gNB. For channel measurement, non-zero power CSI-RS (NZP CSI-RS) resources may be used. For interference measurement reports (IMRs), CSI interference measurement (CSI-IM) resources may be used. A CSI process may include NZP CSI-RS and CSI-IM resources.

A UE may determine CSI-RS transmission parameters through DL control signaling or higher-layer signaling, such as radio resource control (RRC) signaling, from a gNB. Transmission instances of a CSI-RS may be indicated by DL control signaling or be configured by higher layer signaling. A DM-RS may be typically transmitted only within a BW of a respective PDCCH or PDSCH and a UE may use the DM-RS to demodulate data or control information.

Figure 4A:
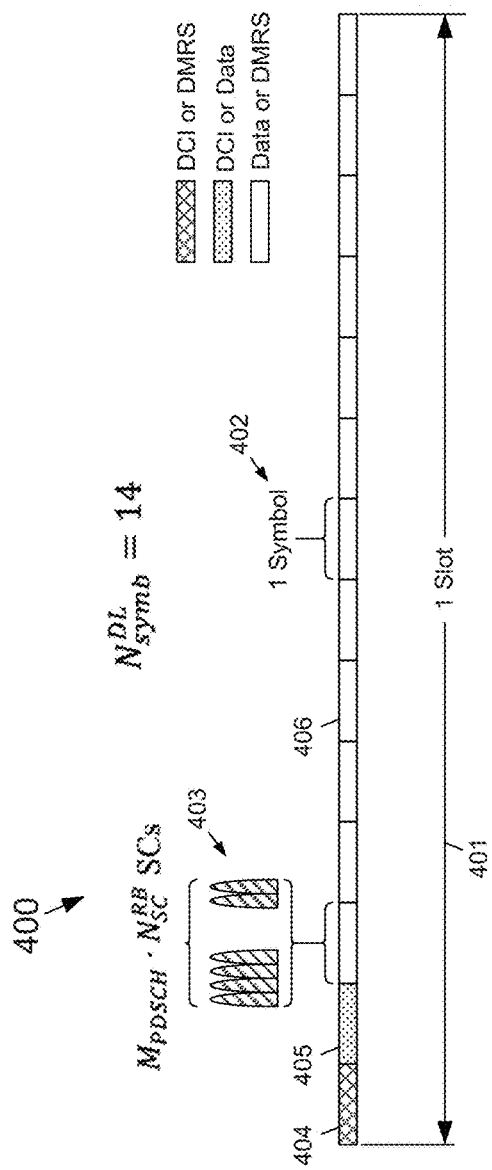
FIG. 4A depicts an example embodiment of a downlink slot structure according to the subject matter disclosed herein.

FIG. 4A depicts an example embodiment of a DL slot structure 400 according to the subject matter disclosed herein. The example embodiment of the DL slot structure 400 depicted in FIG. 4A is for illustration only and may have the same or a similar configuration. FIG. 4 does not limit the scope of the subject matter disclosed herein to any particular implementation. It should be noted that in the DL slot structure 400 described as follows, the DCI information need not be located as depicted in FIG. 4A and may be located elsewhere as appropriate.

As depicted in FIG. 4A, a DL slot 401 may include $N_{symb}^{DL}$ symbols 402 in which a gNB may transmit, for example, data information, DCI, or DM-RS. A DL system BW may include $N_{RB}^{DL}$ RBs. Each RB may include $N_{SC}^{RB}$ SCs. A UE may be assigned $M_{PDSCH}$ RBs for a total of $M_{SC}^{PDSCH} = M_{PDSCH} \cdot N_{SC}^{RB}$ SCs 403 for a PDSCH transmission BW. A PDCCH conveying DCI may be transmitted over control channel elements (CCEs) that are substantially spread across the DL system BW. A first slot symbol 404 may be used by the gNB to transmit PDCCH. A second slot symbol 405 may be used by the gNB to transmit PDCCH or PDSCH. Remaining slot symbols 406 may be used by the gNB to transmit PDSCH and CSI-RS. In some slots, the gNB may also transmit synchronization signals and channels that convey system information, such as synchronization signals and primary broadcast channel (SS/PBCH) blocks.

UL signals may also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access. A UE may transmit data information or UCI through a respective physical UL shared channel (PUSCH) or a physical UL control channel (PUCCH). A PUSCH or a PUCCH may be transmitted over a variable number of symbols in a slot including one symbol. When a UE simultaneously transmits data information and UCI, the UE may multiplex both in a PUSCH.

A UCI may include hybrid automatic repeat request acknowledgement (HARQ-ACK) information, indicating correct or incorrect detection of data transport blocks (TBs) or of code block groups (CBGs) in a PDSCH, scheduling request (SR) indicating whether a UE has data in the buffer to the UE, and CSI reports enabling a gNB to select appropriate parameters for PDSCH or PDCCH transmissions to a UE.

A CSI report from a UE may include a channel quality indicator (CQI) informing a gNB of a largest modulation and coding scheme (MCS) for the UE to detect a TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, a CSI-RS resource indicator (CRI) indicating a CSI-RS resource associated with the CSI report, and a rank indicator (RI) indicating a transmission rank for a PDSCH.

A UL RS may include DM-RS and SRS. A DM-RS may typically be transmitted only within a BW of a respective PUSCH or PUCCH transmission. A gNB may use a DM-RS to demodulate information in a respective PUSCH or PUCCH. A SRS may transmitted by a UE to provide a gNB with an UL CSI and, for a TDD system, an SRS transmission can also provide a PMI for DL transmission. Additionally, in order to establish synchronization or an initial higher-layer connection with a gNB, a UE may transmit a physical random access channel (PRACH).

Figure 4B:
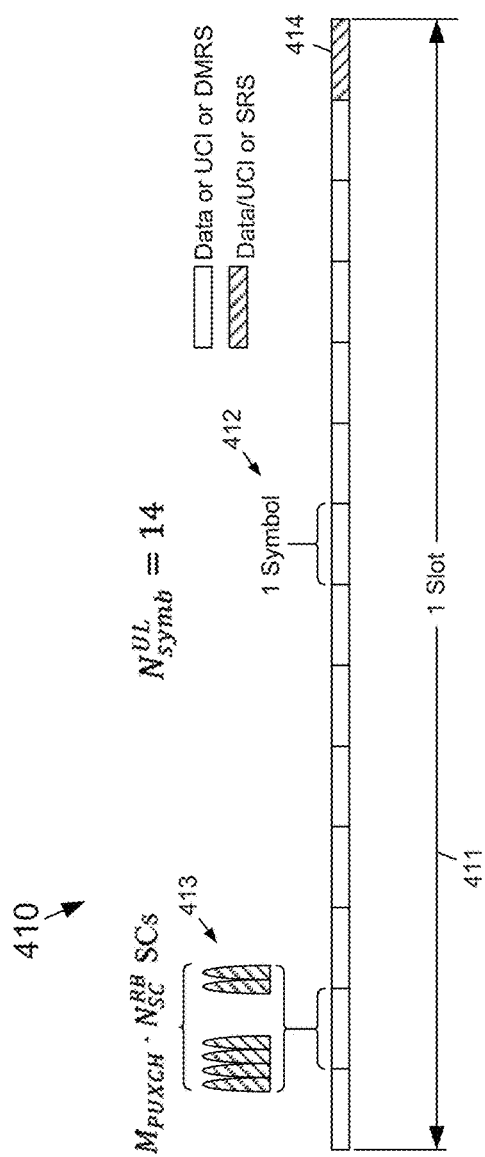
FIG. 4B depicts an example embodiment of an uplink slot structure 410 for physical uplink shared channel transmission or physical uplink control channel transmission according to the subject matter disclosed herein.

FIG. 4B depicts an example embodiment of a UL slot structure 410 for PUSCH transmission or PUCCH transmission according to the subject matter disclosed herein. The embodiment of the UL slot structure 410 depicted in FIG. 4B is for illustration only and could have the same or a similar configuration. FIG. 4B does not limit the scope of the subject matter disclosed herein to any particular implementation. It should be noted that in the UL slot structure 410 described as follows, the UCI information need not be located as depicted in FIG. 4B and may be located elsewhere as appropriate.

As depicted in FIG. 4B, a slot 411 may include $N_{symb}^{UL}$ symbols 412 in which a UE transmits, for example, data information, UCI, or DM-RS. An UL system BW may include N RBs. Each RB may include $N_{SC}^{RB}$. A UE may be assigned $M_{PUXCH}$ RBs for a total of $M_{SC}^{PUXCH} = M_{PUXCH} \cdot N_{SC}^{RB}$ SCs 413 for a PUSCH transmission BW ("X"="S") or for a PUCCH transmission BW ("X"="C"). The last one or more symbols of a slot may be used, for example, to multiplex SRS transmissions 414 or short PUCCH transmissions from one or more UEs.

Figure 5A:
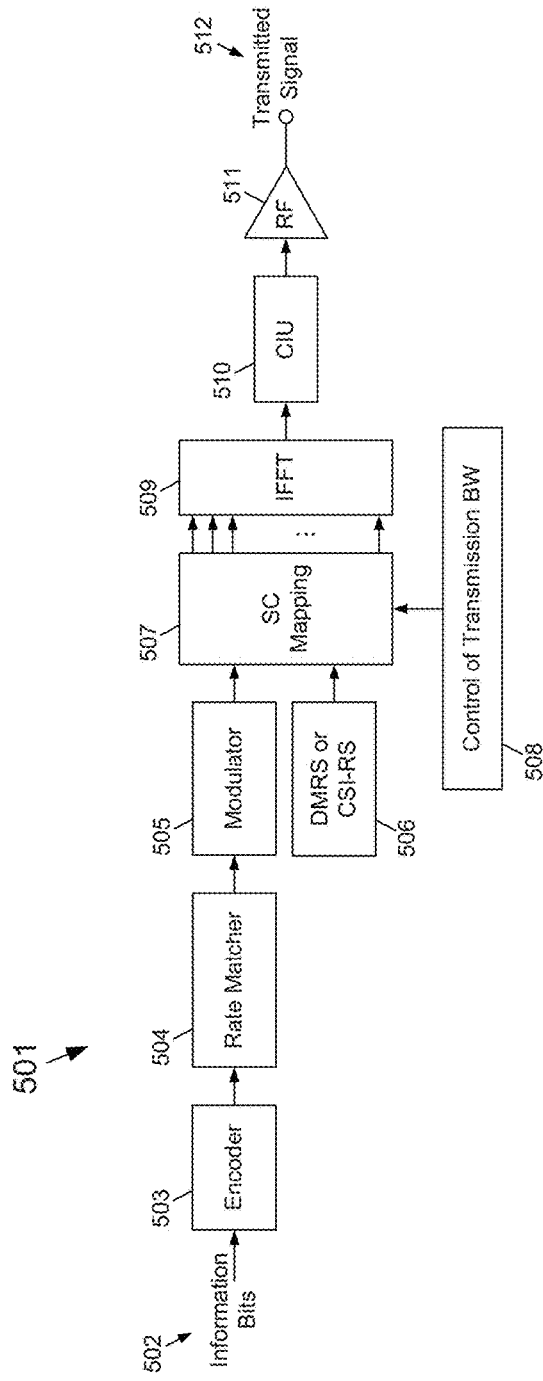
FIG. 5A depicts a block diagram of an example embodiment of a transmitter structure using OFDM according to the subject matter disclosed herein.

FIG. 5A depicts a block diagram of an example embodiment of a transmitter structure 501 using OFDM according to the subject matter disclosed herein. The embodiment of the transmitter structure 501 depicted in FIG. 5A is for illustration only and could have the same or a similar configuration. FIG. 5A does not limit the scope of the subject matter disclosed herein to any particular implementation.

As depicted in FIG. 5A, information bits, such as DCI bits or data information bits 502, may be encoded by an encoder module 503, rate matched to assigned time/frequency resources by a rate matcher module 504 and modulated by a modulator module 505. Subsequently, modulated encoded symbols and DM-RS or CSI-RS module 506 may be mapped to SCs by an SC mapping module 507 controlled by a transmission bandwidth module 508. An inverse fast Fourier transform (IFFT) may be performed by a filter module 509. A cyclic prefix (CP) may be added to the output of the filter module 509. The resulting signal may be filtered by common interface unit (CIU) filter module 510 and transmitted by an RF module 511 as a transmitted signal 512.

Figure 5B:
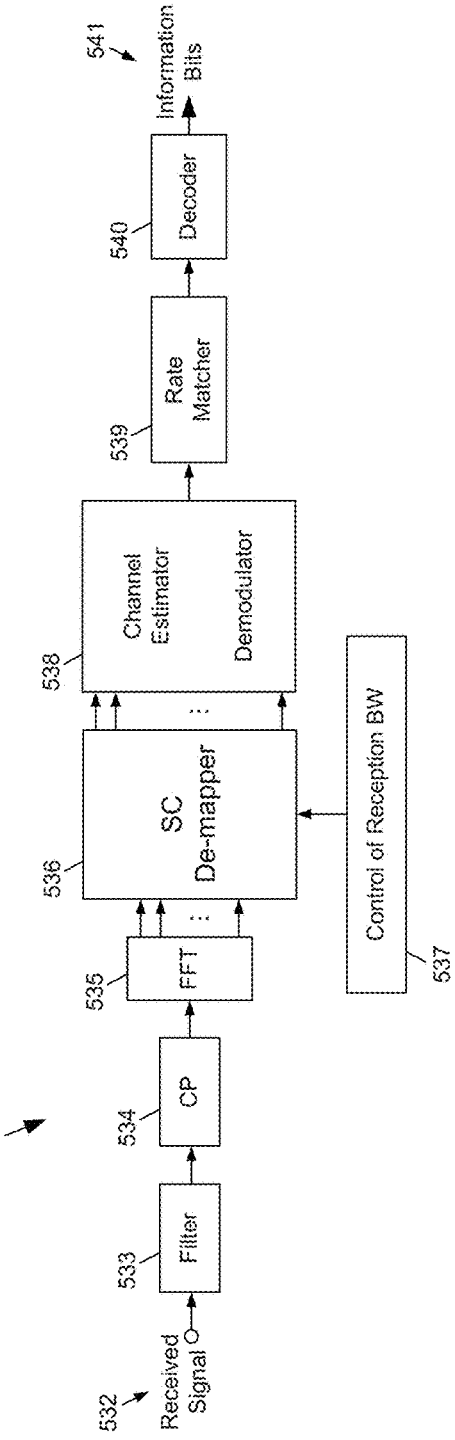
FIG. 5B depicts a block diagram of an example embodiment of an OFDM receiver structure according to the subject matter disclosed herein.

FIG. 5B depicts a block diagram of an example embodiment of an OFDM receiver structure 531 according to the subject matter disclosed herein. The embodiment of the receiver structure 531 depicted in FIG. 5B is for illustration only and could have the same or a similar configuration. FIG. 5B does not limit the scope of the subject matter disclosed herein to any particular implementation. As depicted in FIG. 5B, a received signal 532 may be filtered by a filter module 533. A CP removal module 534 may remove a cyclic prefix. A filter module 535 may apply a fast Fourier transform (FFT). An SC de-mapping module 536 may de-map SCs selected by BW selector module 537. Received symbols may be demodulated by a channel estimator and a demodulator module 538. A rate de-matcher module 539 may restore a rate matching, and a decoder module 540 may decode the resulting bits to provide data information bits 541. DL transmissions and UL transmissions may be based on an orthogonal frequency division multiplexing (OFDM) waveform that includes a variant using a DFT preceding that is known as DFT-spread-OFDM.

If a UE indicates a carrier-aggregation capability larger than four (4) serving cells, the UE may also indicate a maximum number of PDCCH candidates that the UE may monitor per slot when the UE is configured for carrier-aggregation operation over more than four (4) cells. When a UE is not configured for dual connectivity operation, the UE may determine a capability to monitor a total maximum number of PDCCH candidates per slot that corresponds to a maximum number of PDCCH candidates per slot for $N_{cells}^{cap}$ downlink cells in which $N_{cells}^{cap}$ may either be the number of configured downlink cells or may be indicated by the UE.

For each DL bandwidth part (BWP) configured to a UE in a serving cell, the UE may be provided by higher-layer signaling with P≤3 control resource sets (CORESETs). For each CORESET, the UE may be provided a CORESET index p, 0≤p<12, a DM-RS scrambling sequence initialization value, a precoder granularity for a number of resource element groups (REGs) in the frequency domain in which the UE may assume use of a same DM-RS precoder, a number of consecutive symbols, a set of resource blocks (RBs), CCE-to-REG mapping parameters, an antenna port quasi co-location, from a set of antenna port quasi co-locations, indicating quasi co-location information of the DM-RS antenna port for PDCCH reception in a respective CORESET, and an indication for a presence or absence of a transmission configuration indication (TCI) field in a DCI format 1_1 transmitted by a PDCCH.

For each DL BWP configured to a UE in a serving cell, the UE may be provided by higher layers with s≤10 search space sets. For each search space set from the S search space sets, the UE may be provided with a search space set index s, 0≤s<40, an association between the search space set s and a CORESET p, a PDCCH monitoring periodicity of $k_s$ slots and a PDCCH monitoring offset of $o_s$ slots, a PDCCH monitoring pattern within a slot, indicating first symbol(s) of the CORESET within a slot for PDCCH monitoring, a duration of $T_s < k_s$ slots indicating a number of slots that the search space set s exists, a number of PDCCH candidates $M_s^{(L)}$ per CCE aggregation level L, and an indication that search space set s is either a common search space (CSS) set or a UE-specific (USS) set.

When search space set s is a CSS set, the UE may be provided respective indications for whether to monitor PDCCH candidates for DCI formats from a set of predetermined DCI formats that schedule PDSCH receptions or PUSCH transmissions or provide control information. When search space set s is a USS set, the UE may be provided respective indications whether to monitor PDCCH candidates either for DCI formats associated with scheduling PDSCH receptions or PUSCH transmissions.

A UE may determine a PDCCH monitoring occasion on an active DL BWP from the PDCCH monitoring periodicity, the PDCCH monitoring offset, and the PDCCH monitoring pattern within a slot. For search space set s, the UE may determine that a PDCCH monitoring occasion(s) may exist in a slot with number $n_{s,f}^\mu$ in a frame with number $n_f$ if $(n_f N_{slot}^{frame,\mu} + n_{s,f}^\mu - o_s) \bmod k_s = 0$. The UE may monitors PDCCH candidates for search space set s for $T_s$ consecutive slots, starting from slot $n_{s,f}^\mu$, and does not monitor PDCCH candidates for search space set s for the next $k_s - T_s$ consecutive slots.

A USS at CCE aggregation level $L \in \{1, 2, 4, 8, 16\}$ may be defined by a set of PDCCH candidates for CCE aggregation levels L. For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are given by:

$$L \cdot \left\{ \left( Y_{p,n_{s,f}^\mu} + \left\lfloor \frac{m_{s,f_{CI}} \cdot N_{CCE,p}}{L \cdot M_{s,max}^{(L)}} \right\rfloor + n_{CI} \right) \bmod \lfloor N_{CCE,p} / L \rfloor \right\} + i$$

in which for any CSS, $Y_{p,n_{s,f}^\mu} = 0$, for a USS, $$Y_{p,n_{s,f}^\mu} = \left( A_p \cdot Y_{p,n_{s,f_{\mu-1}}} \right) \bmod D,$$

$Y_{p,-1} = n_{RNTI} \neq 0$, $A_p = 39827$ for p mod=3, $A_p = 39829$ for p mod 3=1, $A_p = 39839$ for p mod 3=2, and D=65537, i= 0, . . . , L-1; $N_{CCE,p}$ is the number of CCEs, numbered from 0 to $N_{CCE,p} - 1$, in CORESET p; $n_{CI}$ is the carrier indicator field value if the UE is configured with a carrier indicator field for the serving cell on which PDCCH is monitored; otherwise, including for any CSS, $n_{CI} = 0$, $m_{s,n_{CI}} = 0, \ldots$, $M_{s,n_{CI}}^{(L)} - 1$, in which $M_{s,n_{CI}}^{(L)}$ is the number of PDCCH candidates the UE is configured to monitor for aggregation level L of a search space set s for a serving cell corresponding to $n_{CI}$, for any CSS, $M_{s,max}^{(L)} = M_{s,0}^{(L)}$, for a USS, $M_{s,max}^{(L)}$ is the maximum of $M_{s,n_{CI}}^{(L)}$ over all configured $n_{CI}$ values for a CCE aggregation level L of search space set s, and the radio network temporary identifier (RNTI) value used for $n_{RNTI}$ is a cell RNTI (C-RNTI).

A UE may expect to monitor PDCCH candidates for up to four (4) sizes of DCI formats that include up to three (3) sizes of DCI formats with CRC scrambled by C-RNTI per serving cell. The UE may count a number of sizes for DCI formats per serving cell based on a number of configured PDCCH candidates in respective search space sets for the corresponding active DL BWP.

If a UE is configured with $N_{cells}^{DL,\mu}$ downlink cells for monitoring PDCCH with active DL BWPs or reference DL BWPs having SCS configuration $\mu$ in which $\Sigma_{\mu=0}^3 N_{cells}^{DL,\mu} \leq N_{cells}^{cap}$, the UE may not be required to monitor on the active DL BWPs of scheduling cells more than $M_{PDCCH}^{total,slot,\mu} = M_{PDCCH}^{max,slot,\mu}$ PDCCH candidates or more than $C_{PDCCH}^{max,slot,\mu} = C_{PDCCH}^{max,slot,\mu}$ non-overlapped CCEs per slot for each scheduled cell.

If a UE is configured with $N_{cells}^{DL,\mu}$ downlink cells for monitoring PDCCH with DL BWPs having SCS configuration $\mu$, in which $\Sigma_{\mu=0}^3 N_{cells}^{DL,\mu} > N_{cells}^{cap}$, a DL BWP of an activated cell is the active DL BWP of the activated cell, and a DL BWP of a deactivated cell is the DL BWP with index indicated by higher layers for the deactivated cell, such as a first active DL BWP, the UE is not required to monitor more than $M_{PDCCH}^{total,slots,\mu} = \lfloor N_{cells}^{cap} \cdot M_{PDCCH}^{max,slot,\mu} \cdot N_{cells}^{DL,\mu} / \Sigma_{j=0}^3 N_{cells}^{DL,j} \rfloor$ candidates or more than $C_{PDCCH}^{total,slots,\mu} = \lfloor N_{cells}^{cap} \cdot C_{PDCCH}^{max,slot,\mu} \cdot N_{cells}^{DL,\mu} / \Sigma_{j=0}^3 N_{cells}^{DL,j} \rfloor$ non-overlapped CCEs per slot on the DL BWP(s) of scheduling cell(s) from the $N_{cells}^{DL,\mu}$ downlink cells.

For each scheduled cell, the UE may not be required to monitor on the active DL BWP with SCS configuration p of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

A UE does not expect to be configured CSS sets that result to corresponding total, or per scheduled cell, numbers of monitored PDCCH candidates and non-overlapped CCEs per slot that exceed the corresponding maximum numbers per slot. For same cell scheduling or for cross-carrier scheduling where a scheduling cell and scheduled cell(s) have DL BWPs with same SCS configuration y, a UE does not expect a number of PDCCH candidates and a number of corresponding non-overlapped CCEs per slot on a secondary cell to be larger than the corresponding numbers that the UE is capable of monitoring on the secondary cell per slot. For cross-carrier scheduling, the number of PDCCH candidates for monitoring and the number of non-overlapped CCEs per slot are separately counted for each scheduled cell.

For all search space sets within a slot n, denote by $S_{css}$ a set of CSS sets with cardinality of $I_{css}$ and by $S_{uss}$ a set of USS sets with cardinality of $J_{uss}$. The location of USS sets $S_j$, $0 \leq j < J_{uss}$, in $S_{uss}$, is according to an ascending order of the search space set index. Denote by $$M_{S_{css(i)}}^{(L)}, 0 \leq i < I_{css},$$

the number of counted PDCCH candidates for monitoring for CSS set $S_{css(i)}$ and by $$M_{S_{uss(i)}}^{(L)},$$

$0 \leq j < J_{uss}$, the number of counted PDCCH candidates for monitoring for USS set $S_{uss(i)}$.

For the CSS sets, a UE monitors $$M_{PDCCH}^{CSS} = \sum_{i=0}^{I_{CSS}-1} \sum_L M_{S_{css(i)}}^{(L)}$$

PDCCH candidates requiring a total of $C_{PDCCH}^{CSS}$ non-overlapping CCEs in a slot.

The UE allocates PDCCH candidates for monitoring to USS sets for the primary cell having an active DL BWP with SCS configuration $\mu$ in slot n according to the following pseudocode as shown in Table 1. Denote by $V_{CCE}(s_{uss(j)})$ the set of non-overlapping CCEs for search space set $S_{uss(j)}$ and by $C(V_{CCE}(S_{uss(j)})$ the cardinality of $V_{CCE}(S_{uss(j)})$ in which the non-overlapping CCEs for search space set $S_{uss(j)}$ are determined considering the allocated PDCCH candidates for monitoring for the CSS sets and the allocated PDCCH candidates for monitoring for all search space sets $S_{uss(k)}$, $0 \leq k \leq j$.

TABLE 1

Pseudocode

Set $M_{PDCCH}^{USS} = \min(M_{PDCCH}^{max,slot,\mu}, M_{PDCCH}^{total,slot,\mu}) - M_{PDCCH}^{CSS}$
Set $C_{PDCCH}^{USS} = \min(C_{PDCCH}^{max,slot,\mu}, C_{PDCCH}^{total,slot,\mu}) - C_{PDCCH}^{CSS}$
Set j = 0 while $\Sigma_L M_{S_{uss(j)}}^{(L)} \leq M_{PDCCH}^{USS}$ AND $C(V_{CCE}(S_{uss(j)})) \leq C_{PDCCH}^{uss}$ allocate $\Sigma_L M_{S_{uss(j)}}^{(L)PDCCH}$ candidates for monitoring to USS set $S_{uss(j)} M_{PDCCH}^{uss} = M_{PDCCH}^{uss} - \Sigma_L M_{S_{uss(j)}}^{(L)}$ ;

$C_{PDCCH}^{uss} = C_{PDCCH}^{uss} - C(V_{CCE}(S_{uss(j)}))$;
j = j + 1;
end while A time span for PDCCH monitoring may be defined by a pair of (X,Y) values in the unit of symbols. For any two PDCCH monitoring occasions of a same search space set or of different search space sets, there is a minimum time separation of X symbols (including the cross-slot boundary case) between the start of two spans (span gap). Each span may be of length up to Y consecutive symbols, starts at a first symbol where a PDCCH monitoring occasion starts, and ends at a last symbol where a PDCCH monitoring occasion ends. For example, Y may be the largest CORESET length for search space sets that the UE monitors PDCCH within X consecutive symbols.

A UE may perform additional PDCCH monitoring within a slot when the additional PDCCH monitoring starts at least after X symbols from the start of a previous one. A first search space set may be associated with a smaller PDCCH monitoring time span, or at least with a smaller span gap value X, than a second search space set because, for example, the first search space set may be associated with scheduling applications requiring shorter latency requirements that the second search space set. A total number of PDCCH candidates and a total number of non-overlapped CCEs for a UE configured search space sets with different PDCCH monitoring span gaps X should, therefore, be determined.

PDCCH transmissions may represent material overhead of DL resources or, for a flexible duplex system, of total resources. For example, when a UE density per cell may be large, such as for machine-type communications that is also often referred to as internet-of-things (IoT) communications, a number of PDCCH transmissions from a gNB per slot on a cell may potentially consume a large percentage of frequency resources on the cell. Further, a bandwidth of a cell may be shared for transmission with different radio access technologies, such as long-term evolution (LTE) and new radio (NR), and resources for PDCCH transmission may not always be available.

Although PDCCH transmissions may be avoided when PDSCH receptions or PUSCH or PUCCH transmissions by UEs are configured by higher layers, such as by radio resource control (RRC) signaling, this results in an inflexible network operation without a possibility for fast link adaptation and with any change in the communication setup requiring reconfigurations by higher-layer signaling.

For example, several attributes related to receptions by a UE or transmissions from a UE on a cell, such as time-frequency resources (patterns) for rate matching receptions or transmissions, may be provided/configured to UEs by higher layers through common system information or through UE-specific information. A reconfiguration of such attributes may involve the UEs to be paged and then scheduled PDSCH reception, by a DCI format in a PDCCH, for system information providing the reconfiguration or for each UE to be individually provided the reconfiguration in a scheduled PDSCH reception by a DCI format in a PDCCH. Those mechanisms to update a configuration of communication parameters, based on paging and subsequent system information update or based on UE-specific higher layer signaling for each UE, may be difficult for a network to support and this limits an ability of the network to flexibly adapt to variations in traffic or channel medium characteristics. Similarly, for configuration of parameter values such as a modulation and coding scheme (MCS) table, or for a time domain resource allocation (TDRA) table by UE-specific RRC signaling, or of a transmission configuration indication (TCI) state for a CORESET, a delay for a reconfiguration of the parameter values by RRC signaling may be too large in some case and this also may limit an ability of a network to adapt to changing traffic or channel conditions or to UE mobility.

In a cellular system, a user equipment (UE) may monitor a physical downlink control channel (PDCCH) search space (SS) to obtain downlink control information (DCI) that provides control information for a downlink operation performed by the UE. Each time instance of a PDCCH SS may be referred to as a monitoring occasion (MO). In order to improve system latency and flexibility, location of a monitoring occasion may be arbitrary within a slot in the new radio (NR) specification of Release 16 (REL-16) of 3$^{rd}$ Generation Partnership Project (3GPP). A slot may include, for example, 14 or 12 orthogonal frequency-division multiplexing (OFDM) symbols. Such flexibility, however, may increase PDCCH monitoring complexity of a UE. UE capability signaling may limit an MO pattern within each slot based on REL-15 of the NR specification. To satisfy a declared UE signaling capability, a network provides a PDCCH SS configuration. The following Table 2, which appears in 3GPP TR 38.822, describes the corresponding UE capability signaling.

TABLE 2

| Index | Feature group | Components | Field name in TS 38.331 |
|---|---|---|---|
| 3-5b | All PDCCH monitoring occasion can be any OFDM symbol(s) of a slot for Case 2 with a span gap | PDCCH monitoring occasions of FG-3-, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where | pdcch-Monitoring AnyOccasionsWithSpan Gap (X, Y): set1 = (7, 3); set2 = (4, 3) and (7, 3); set3 = (2, 2) and (4, 3) |

TABLE 2-continued

| Index | Feature group | Components | Field name in TS 38.331 |
|---|---|---|---|
| | | each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max {maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | and (7, 3). |

Table 2 above refers to FG-3-1, which is described in Table 3 below.

TABLE 3

| Index | Feature group | Components | Field name in TS 38.331 |
|---|---|---|---|
| 3-1 | Basic DL control channel | 1) One configured CORESET per BWP per cell in addition to CORESET0 CORESET resource allocation of 6RB bit-map and duration of 1-3 OFDM symbols for FR1 For type 1 CSS without dedicated RRC configuration and for type 0, 0A, and 2 CSSs, CORESET resource allocation of 6RB bit-map and duration 1-3 OFDM symbols for FR2 For type 1 CSS with dedicated RRC configuration and for type 3 CSS, UE specific SS, CORESET resource allocation of 6RB bit-map and duration 1-2 OFDM | n/a |

TABLE 3-continued

| Feature Index | Feature group | Components | Field name in TS 38.331 |
|---|---|---|---|
| | | symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

A monitoring span, as described in Feature Group 3-5b in Table 3, may include consecutive symbols within a slot, and a span pattern within a slot may be determined based on an MO pattern, a set of monitoring capability (X,Y) UE reports, and a control resource set (CORESET) configuration for the UE. In particular, spans within a slot may have the same duration, which may be determined by max{maximum value of all CORESET durations, minimum value of Y in the UE reported candidate value} except possibly the last span in a slot, which may have a shorter duration. The first span in the span pattern within a slot may begin at the symbol having the smallest index for which a monitoring occasion is configured to a UE. The next span may begin with an MO, which need not be included in the first span, and the same procedure may be applied to construct the following spans. The separation between any two consecutive spans within and across slots may satisfy the same (X,Y) limit in which X represents the minimum time separation of OFDM symbols of two spans and Y represents the maximum number of consecutive OFDM symbols for each span.

Based on Rel-15, a UE may report its monitoring capability from three possible sets: $\{(7,3)\}$, $\{(4,3), (7,3)\}$, $\{(2,2), (4,3), (7,3)\}$. As used herein, the term "capability set" is used to indicate one of the three possible sets: $\{(7,3)\}$, $\{(4,3), (7,3)\}$, $\{(2,2), (4,3), (7,3)\}$ that are possible under Rel-15, and any other possible set that is available under Rel-16. A UE may report monitoring capability support for multiple sets (X,Y), but the reported capability support does not imply simultaneous support for all of the reported sets depending upon the feature set selected by the gNB. In one embodiment, the set (X,Y) that the UE should use is received by the UE as a dedicated RRC message that is carried in PDSCH, which is scheduled by PDCCH. In another embodiment, the set (X,Y) that the UE should use is implied based on the monitoring capability reported by the UE. An important aspect here is that PDCCH monitoring subject to (X,Y) is an optional feature for a UE. There is a basic (non-optional) PDCCH monitoring behavior that is mandated to every UE that is not subject to (X,Y). In the basic behavior, a PDCCH monitoring occasion is concentrated in the first three OFDM symbols in each slot and has nothing to do with (X,Y). Thus, in one embodiment the RRC message carrying a set of (X,Y) selected by the gNB is scheduled by the PDCCH using the basic monitoring behavior of a UE.

Figure 6:
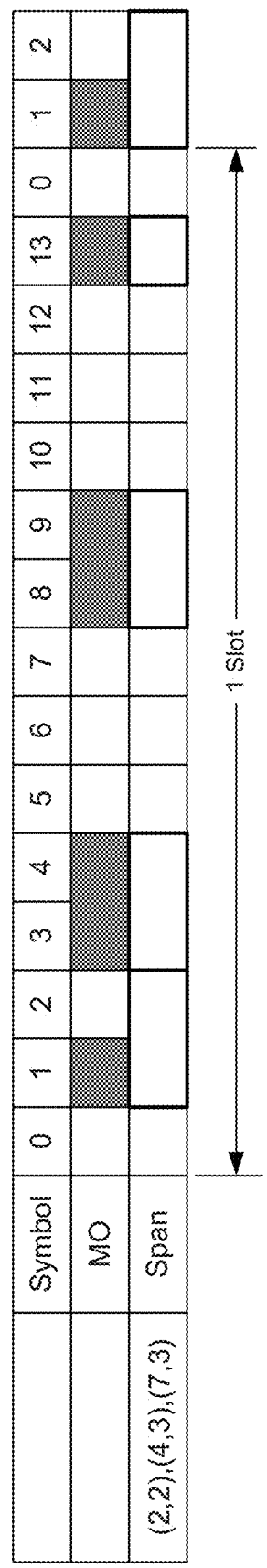
FIG. 6 depicts an example CORESET configuration and an example monitoring capability reported by an UE according to the subject matter disclosed herein.

The reported capability only implies that the UE will support any one set (X,Y) An example is shown in FIG. 6 in which the MO pattern described by the gray-filled boxes correspond to a span pattern described by unfilled boxes. If, for example, a UE reports the set $\{(2,2), (4,3), (7,3)\}$, the pattern depicted by the gray-filled boxes satisfy (2,2). A UE indicates which sets of (X,Y) pairs the UE is capable of supporting (i.e., which sets of requirements (minimum span length, maximum span gap) it is capable of meeting). For example, a UE might indicate to the network that the UE can support a set1=$\{(2,2),(4,3)\}$, or a set2=$\{(7,3),(4,3)\}$. The network will select one of these two sets, and then will send a DCI based on the understanding that the UE will be monitoring for the D using a monitoring pattern that satisfies the set of requirements selected by the network. An unresolved issue in the 5G Specification for this example is how does a UE know which of the two sets the network has selected? The UE may need to perform different monitoring behaviors based on which set the network has selected, so the UE needs to know which set the network selected.

Note that a smaller value of X may make monitoring more frequent, i.e., more challenging, from a UE point of view. A nested capability signaling, i.e., a UE supporting a given X value, should also support larger X values, and which may be reasonable considering the impact on signaling overhead.

During development of 3GPP REL-16, span-based PDCCH monitoring capability for Ultra-Reliable and Low-latency Communications (URLLC) was defined to be:

Support (2, 2) (4, 3) (7, 3) defined in UE feature 3-5b as the combination (X, Y) for Rel-16
PDCCH monitoring capability on the per-CC limit on the maximum number of non-
overlapping CCEs for URLLC.
UE reports the supported combinations per SCS
(2, 2)(4, 3)(7, 3) applicable for 15 kHz and 30 kHz
If UE reports the support of more than one combination of C(X, Y) for a given SCS, and if
multiple combinations of C(X, Y) are valid for the span pattern, the maximum value of C of
the valid combinations is applied.
A combination C(X, Y) is valid if the span pattern satisfies X and Y of the given
combination in every slot, including cross slot boundary To declare support of span-based PDCCH monitoring, a UE may report (X,Y) combinations that it supports. In the 3GPP specification 213, the following procedure is provided for the situation in which a UE reports multiple (X,Y)s. In the following procedure, a UE may determine the actual (X,Y) that is selected and utilized by the network based on the set of (X,Y)s reported by the UE.

A UE device can indicate a capability to monitor PDCCH according to one or more of the
combinations (X, Y) = (2, 2), (4, 3), and (7, 3) per SCS configuration of $\mu = 0$ and $\mu = 1$. If
the UE device indicates a capability to monitor PDCCH according to multiple (X, Y) combinations
and a configuration of search space sets to the UE for PDCCH monitoring on a cell
results to a separation of every two consecutive PDCCH monitoring spans that is equal to or
larger than the value of X for two or more of the multiple combinations (X, Y), the UE is
expected to monitor PDCCH on the cell according to the combination (X, Y) associated with
the largest maximum number $C_{PDCCH}^{max, (X, Y), \mu}$ and $M_{PDCCH}^{max, (X, Y), \mu}$.

Generally, there may also be several possible ways how a UE reports a set of (X,Y)s. The following is a non-limiting list of possible ways to report UE capability:

(1) A UE may report its capability to perform certain features in any scenario. In this case, it may be said that the UE reports its capability on a per-UE basis.
(2) A UE may report its capability to perform certain features in particular bands. In this case, it may be said that the UE reports its capability on a per-band basis.
(3) A UE may report its capability to perform certain features in particular band combinations for CA. In this case, it may be said that the UE reports its capability on a per-band combination or per-BC basis.
(4) A UE may report its capability to perform certain features in specific band(s) in a particular band combination for CA. In this case, a mechanism referred to as feature sets may be used to allow for such flexibility in reporting, and it may be said that the UE reports its capability on a per-featureSet or per-FS basis.
(5) A UE may report its capability to perform certain features in specific component carrier(s) (CC) in a particular band combination for CA. In this case, a mechanism referred to as feature sets per cc may be used to allow for flexibility in reporting, and it may be said that the UE reports its capability on a per-feature-Set per cc or per-FSPC basis.

In the list above of possible ways to report UE capability, a band combination is a collection of bands to represent a CA configuration, as described in 3GPP Specification 38.101. Flexibility for a UE device to declare support of certain features increases from the first entry to the last entry in the list above. That is, a UE has less flexibility to declare support for certain features using the first possible way listed as compared to any of the other subsequent ways in the list. For example, if feature A and feature B are reported on a per-FSPC basis, a UE may have full flexibility to support only one of feature A and a feature B in each CC. However, when those features are reported on a per-UE basis, then a UE may always need to support the indicated capabilities. A trade-off associated with the added flexibility may be an overhead in signaling. Hence, how a certain feature may be declared should account for the complexity of the feature in UE implementation and the associated signaling overhead.

The features for which a UE may declare support include features in 4.2.7.5 FeatureSetDownlink parameters of Rel-16 of the 3GPP TS 38.306 Technical Specification, which is set forth below.

4.2.7.5. FeatureSetDownlink Parameters

| Definitions for parameters | Per | M | FDD-TDD DIFF | FR1-FR2 DIFF |
|---|---|---|---|---|
| additionalDMRS-DL-Alt<br>Indicates whether the UE supports the alternative additional DMRS position for co-existence with LTE CRS. It is applied to 15 kHz SCS and one additional DMRS case only. | FS | No | N/A | FR1 only |
| cbgPDSCH-ProcessingType1-DifferentTB-PerSlot-r16<br>Defines whether the UE capable of processing time capability 1 supports CBG based reception with one or with up to two or with up to four or with up to seven unicast PDSCHs per slot per CC. | FS | No | N/A | N/A |
| cbgPDSCH-ProcessingType2-DifferentTB-PerSlot-r16<br>Defines whether the UE capable of processing time capability 2 supports CBG based reception with one or with up to two or with up to four or with up to seven unicast PDSCHs per slot per CC. | FS | No | N/A | N/A |

-continued

| Definitions for parameters | Per | M | FDD-TDD DIFF | FR1-FR2 DIFF |
|---|---|---|---|---|
| crossCarrierSchedulingProcessing-DiffSCS-r16<br>Indicates the UE cross carrier scheduling processing capability for DL carrier aggregation processing up to X unicast DCI scheduling for DL per scheduled CC. X is based on pair of (scheduling CC SCS, scheduled CC SCS) where a pair of (15, 120), (15, 60), (30, 120) kHz SCS can have X = {1, 2, 4} while a pair of (15, 30), (30, 60), (60, 120) kHz SCS can have X = {2}, and X applies per span in a slot of scheduling CC. | FS | No | N/A | N/A |
| csi-RS-MeasSCellWithoutSSB<br>Defines whether the UE can perform CSI-RSRP and CSI-RSRQ measurement as specified in TS 38.215 [13], where CSI-RS resource is configured for a cell that does not transmit SS/PBCH block. A UE that supports this feature shall also support scellWithoutSSB. | FS | No | N/A | N/A |
| dl-MCS-TableAlt-DynamicIndication<br>Indicates whether the UE supports dynamic indication of MCS table for PDSCH. | FS | No | N/A | N/A |
| featureSetListPerDownlinkCC<br>Indicates which features the UE supports on the individual DL carriers of the feature set (and hence of a band entry that refer to the feature set) by FeatureSetDownlinkPerCC-Id. The order of the elements in this list is not relevant, i.e., the network may configure any of the carriers in accordance with any of the FeatureSetDownlinkPerCC-Id in this list. A fallback per CC feature set resulting from the reported feature set per DL CC is not signalled but the UE shall support it. | FS | N/A | N/A | N/A |
| intraBandFreqSeparationDL, intraBandFreqSeparationDL-v1620<br>Indicates DL frequency separation class the UE supports, which indicates a maximum frequency separation between lower edge of lowest CC and upper edge of highest CC in a frequency band, for intra-band non-contiguous CA. The UE sets the same value in the FeatureSetDownlink of each band entry within a band. The values mhzX correspond to the values XMHz defined in TS 38.101-2 [3], It is mandatory to report for UE which supports DL intra-band non-contiguous CA in FR2.<br>If the UE sets the field intraBandFreqSeparationDL-v1620 it shall set intraBandFreqSeparationDL (without suffix) to the nearest smaller value. | FS | CY | N/A | FR2 only |
| intraBandFreqSeparationDL-Only-r16<br>Indicates whether the UE supports frequency separation class of DL only extension. If present, the field extends the maximum frequency separation between the lower edge of lowest CC and the upper edge of highest CC in a frequency band that the UE supports according to intraBandFreqSeparationDL. The frequency range extension is either above or below the frequency range indicated by IntraBandFreqSeparationDL and extends it in contiguous manner with no frequency gap, and the network may configure contiguous or non-contiguous downlink serving cells in that extended range. The UE sets the same value in the FeatureSetDownlink of each band entry within a band. The values mhzX correspond to the values XMHz defined in TS38.101-2 [3]. The sum of intraBandFreqSeparationDL and intraBandFreqSeparationDL-Only shall not exceed 2400 MHz. If the UE sets this field, the sum of intraBandFreqSeparationDL and intraBandFreqSeparationDL-Only shall be larger than 1400 MHz.<br>A UE supporting this feature shall also support intraBandFreqSeparationDL. | FS | No | N/A | FR2 only |
| intraFreqDAPS-r16<br>Indicates whether UE supports intra-frequency DAPS handover, e.g. support of simultaneous DL reception of PDCCH and PDSCH from source and target cell. A UE indicating this capability shall also support synchronous DAPS handover, single UL transmission and cancelling UL transmission to the source cell for intra-frequency DAPS handover. The capability signalling comprises of the following parameters:<br>intraFreqAsyncDAPS-r16 indicates whether the UE supports asynchronous DAPS handover.<br>intraFreqDiffSCS-DAPS-r16 indicates whether the UE supports different SCSs in source PCell and intra-frequency target PCell in DAPS handover. The UE only includes this field if different SCSs can be supported in both UL and DL. If absent, the UE does not support either UL or DL SCS being different in DAPS handover. | FS | No | N/A | N/A |
| oneFL-DMRS-ThreeAdditionalDMRS-DL<br>Defines whether the UE supports DM-RS pattern for DL transmission with 1 symbol front-loaded DM-RS with three additional DM-RS symbols. | FS | No | N/A | N/A |
| oneFL-DMRS-TwoAdditionalDMRS-DL<br>Defines support of DM-RS pattern for DL transmission with 1 symbol front-loaded DM-RS with 2 additional DM-RS symbols and more than 1 antenna ports. | FS | Yes | N/A | N/A |
| pdcch-Monitoring-r16<br>Indicates whether the UE supports PDCCH search space monitoring occasions in any symbol of the slot with minimum time separation between two consecutive transmissions of PDCCH with span up to two OFDM symbols for two OFDM symbols or span up to three OFDM symbols for four and seven OFDM symbols. The different value can be reported for PDSCH processing type 1 and PDSCH processing type 2, respectively. For each sub-carrier spacing, the leading/leftmost bit (bit 0) corresponds to the supported value set (X, Y) of (7, 3). The next bit (bit 1) corresponds to the supported value set (X, Y) of (4, 3). The rightmost bit (bit 2) corresponds to the supported value set (X, Y) of (2, 2). | FS | No | N/A | N/A |
| pdcch-MonitoringAnyOccasions<br>Defines the supported PDCCH search space monitoring occasions. withoutDCI-gap indicates whether the UE supports PDCCH search space monitoring occasions in any symbol of the slot for Type 1 -PDCCH common search space configured by dedicated RRC signaling, for a Type 3-PDCCH common search space, or for a UE-specific search space | FS | No | N/A | N/A |

| Definitions for parameters | Per | M | FDD-TDD DIFF | FR1-FR2 DIFF |
|---|---|---|---|---|
| with the capability of supporting at least 44, 36, 22, and 20 blind decodes in a slot for 15 kHz, 30 kHz, 60 kHz, and 120 kHz subcarrier spacing values respectively. withDCI-gap indicates whether the UE supports PDCCH search space monitoring occasions in any symbol of the slot with minimum time separation of two OFDM symbols for 15 kHz, four OFDM symbols for 30 kHz, seven OFDM symbols for 60 kHz with NCP, and 14OFDM symbols for 120 kHz between two consecutive transmissions of PDCCH scrambled with C-RNTI, MCS-C-RNTI, or CS-RNTI for Type 1-PDCCH common search space configured by dedicated RRC signaling, for a Type 3-PDCCH common search space, or for a UE-specific search space, with the capability of supporting at least 44, 36, 22, and 20 blind decodes in a slot for 15 kHz, 30 kHz, 60 kHz, and 120 kHz subcarrier spacing values respectively. | | | | |
| pdcch-MonitoringAnyOccasionsWithSpanGap<br>Indicates whether the LIE supports PDCCH search space monitoring occasions in any symbol of the slot with minimum time separation between two consecutive transmissions of PDCCH with span up to two OFDM symbols for two OFDM symbols or span up to three OFDM symbols for four and seven OFDM symbols. Value sell indicates the supported value set (X, Y) is (7, 3), value set2 indicates the supported value set (X, Y) is (4, 3) and (7, 3) and value set 3 indicates the supported value set (X, Y) is (2, 2), (4, 3) and (7, 3). | FS | No | N/A | N/A |
| pdcch-MonitoringMixed-r16<br>Indicates support of Rel-15 monitoring capability and pdcch-Monitoring-r16 on different seiwing cells. | FS | No | N/A | N/A |
| pdsch-ProcessingType1-DifferentTB-PerSlot<br>Defines whether the LIE capable of processing time capability 1 supports reception of up to two, four or seven unicast PDSCHs for several transport blocks with PDSCH scrambled using C-RNTI, TC-RNTI, or CS-RNTI in one serving cell within the same slot per CC that are multiplexed in time domain only.<br>NOTE: PDSCH(s) for Msg. 4 is included. | FS | No | N/A | N/A |
| pdsch-ProcessingType2<br>Indicates whether the UE supports PDSCH processing capability 2. The UE supports it only if all serving cells are self-scheduled and if all serving cells in one band on which the network configured processingType2 use the same subcarrier spacing. This capability signalling comprises the following parameters for each sub-carrier spacing supported by the UE.<br>fallback indicates whether the UE supports PDSCH processing capability 2 when the number of configured carriers is larger than numberOfCarriers for a reported value of differentTB-PerSlot. If fallback - 'sc', UE supports capability 2 processing time on lowest cell index among the configured carriers in the band where the value is reported, if fallback = 'cap1-only', UE supports only capability 1, in the band where the value is reported;<br>differentTB-PerSlot indicates whether the UE supports processing type 2 for 1, 2, 4 and/or 7 unicast PDSCHs for different transport blocks per slot per CC; and if so, it indicates up to which number of CA serving cells the UE supports that number of unicast PDSCHs for different TBs. The UE shall include at least one of numberOfCarriers for 1, 2, 4 or 7 transport blocks per slot in this field if pdsch-ProcessingType2 is indicated. | FS | No | N/A | FR1 only |
| pdsch-ProcessingType2-Limited<br>Indicates whether the UE supports PDSCH processing capability 2 with scheduling limitation for SCS 30 kHz. This capability signalling comprises the following parameter.<br>differentTB-PerSlot-SCS-30 kHz indicates the number of different TBs per slot.<br>The UE supports this limited processing capability 2 only if:<br>1) One carrier is configured in the band, independent of the number of carriers configured in the other bands;<br>2) The maximum bandwidth of PDSCH is 136 PRBs;<br>3) N1 based on Table 5.3-2 of TS 38.214 [12] for SCS 30 kHz. | FS | No | N/A | FR1 only |
| pdsch-Separation With Gap<br>Indicates whether the UE supports separation of two unicast PDSCHs with a gap, applicable to Sub-carrier spacings of 30 kHz and 60 kHz only. For any two consecutive slots n and n + 1, if there are more than 1 unicast PDSCH in either slot, the minimum time separation between starting time of any two unicast PDSCHs within the duration of these slots is 4 OFDM symbols for 30 kHz and 7 OFDM symbols for 60 kHz. | FS | No | N/A | N/A |
| scalingFactor<br>Indicates the scaling factor to be applied to the band in the max data rate calculation as defined in 4.1.2. Value f0p4 indicates the scaling factor 0.4, f0p75 indicates 0.75, and so on. If absent, the scaling factor 1 is applied to the band in the max data rate calculation. | FS | No | N/A | N/A |
| scellWithoutSSB<br>Defines whether the UE supports configuration of SCell that does not transmit SS/PBCH block. This is conditionally mandatory with capability signalling for intra-band CA but not supported for inter-band CA. | FS | CY | N/A | N/A |
| searchSpaceSharingCA-DL<br>Defines whether the UE supports DL PDCCH search space sharing for carrier aggregation operation. | FS | No | N/A | N/A |
| singleDCI-SDM-scheme-r16<br>Indicates whether the UE supports single DCI based spatial division multiplexing scheme. | FS | No | N/A | N/A |
| supportedSRS-Resources | FS | FD | N/A | N/A |

| Definitions for parameters | Per M | FDD-TDD DIFF | FR1-FR2 DIFF |
|---|---|---|---|
| Defines support of SRS resources for SRS carrier switching for a band without associated FeatureSetuplink. The capability signalling comprising indication of: maxNumberAperiodicSRS-PerBWP indicates supported maximum number of aperiodic SRS resources that can be configured for the UE per each BWP maxNumberAperiodicSRS-PerBWP-PerSlot indicates supported maximum number of aperiodic SRS resources per slot in the BWP maxNumberPeriodicSRS-PerBWP indicates supported maximum number of periodic SRS resources per BWP maxNumberPeriodicSRS-PerBWP-PerSlot indicates supported maximum number of periodic SRS resources per slot in the BWP maxNumberSemiPersistentSRS-PerBWP indicate supported maximum number of semi-persistent SRS resources that can be configured for the UE per each BWP maxNumberSemiPersistentSRS-PerBWP-PerSlot indicates supported maximum number of semi-persistent SRS resources per slot in the BWP maxNumberSRS-Ports-PerResource indicates supported maximum number of SRS antenna port per each SRS resource If the UE indicates the support of srs-CarrierSwitch for this band and this field is absent, the UE supports one periodic, one aperiodic, no semi-persistent SRS resources per BWP per slot and one SRS antenna port per SRS resource. | | | |
| timeDurationForQCL Defines minimum number of OFDM symbols required by the UE to perform PDCCH reception and applying spatial QCL information received in DCI for PDSCH processing as described in TS 38.214 [12] clause 5.1.5. UE shall indicate one value of the minimum number of OFDM symbols per each subcarrier spacing of 60 kHz and 120 kHz. | FS Yes | N/A | FR2 only |
| twoFL-DMRS-TwoAdditionalDMRS-DL Defines whether the UE supports DM-RS pattern for DL transmission with 2 symbols front-loaded DM-RS with one additional 2 symbols DM-RS. | FS No | N/A | N/A |
| type1-3-CSS Defines whether the UE is able to receive PDCCH in FR2 in a Type 1-PDCCH common search space configured by dedicated RRC signaling, in a Type3-PDCCH common search space or a UE-specific search space if those are associated with a CORESET with a duration of 3 symbols. | FS Yes | N/A | FR2 only |
| ue-SpecificUL-DL-Assignment Indicates whether the UE supports dynamic determination of UL and DL link direction and slot format based on Layer 1 scheduling DCI and higher layer configured parameter TDD-UL-DL-ConfigDedicated as specified in TS 38.213 [11]. | FS No | N/A | N/A |

When per-FS or per-FSPC reporting basis is used to indicate UE capability, a UE may indicate multiple different variants of a single parameter or feature. Using an earlier example, a UE may report multiple different sets of (X,Y)s, such as set1={(2,2),(4,3)}, set2={(7,3),(4,3)}. In this case, a network may choose a certain set from multiple reported sets, although it may not always be clear which set the network may chose for a reporting UE.

Although a UE may have a unique and explicit understanding regarding the set of (X,Y) combinations that eventually determine the actual (X,Y) to use.

There may be, however, ambiguity because the network does not explicitly indicate which (X,Y) to use. For example, consider the situation of component carrier aggregation with two component carriers, band A and band B. A UE may declare from the following four feature sets: (1) ({(2,2)} and 15 kHz in band A, {(2,2)} and 15 kHz in band B); (2) ({(4,3), (7,3)} and 15/30 kHz in band A, {(4,3), (7,3)} and 15/30 kHz in band B); (3) ({(2,2)} and 15 kHz in band A, {(4,3), (7,3)} and 15/30 kHz in band B); and (4) ({(4,3), (7,3)} and 15/30 kHz in band A, {(2,2)} and 15 kHz in band B), with the restriction that the UE may support (2,2) with only a 15 kHz subcarrier spacing.

This means that if the UE supports 30 kHz subcarrier spacing, the UE cannot support the (2,2) pattern. The combinations of the features that the UE may declare includes combinations of the subcarrier spacing and the (X,Y) pattern between band A and band B. Reporting capability for the first feature set indicates that the UE can support the combination of {(2,2)} and 15 kHz in band A, {(2,2)} and 15 kHz in band B. Reporting capability for the second feature set indicates that the UE can support the combination of both (4,3), (7,3) and both 15 and 30 kHz subcarrier spacing in band A, the combination of both (4,3), (7,3) and both 15 and 30 kHz subcarrier spacing in band B. With this capability, the UE now supports 30 kHz because the (2,2) capability has not been included. Reporting the third feature set would mean that the UE can support (2,2) and 15 kHz subcarrier spacing in band A, and the combination of both (4,3), (7,3) with both 15 and 30 kHz subcarrier spacing in band B. Reporting capability for the fourth feature set indicates that the UE can support the combination of both (4,3), (7,3) and both 15 and 30 kHz subcarrier spacing in band A,{(2,2)} and 15 kHz in band B. Thus, the EU may support the four feature sets with the restriction that the UE may support (2,2) with only a 15 kHz subcarrier spacing.

Currently, the UE may not simply communicate the restriction to a gNB, so the UE only report support allowed combinations by reporting all four feature sets. Doing so, however, includes an ambiguity. Support has been reported in band A for patterns (4,3) and (7,3), and support was reported for pattern (2,2) in band A, and a 15 kHz subcarrier spacing belongs to both cases. If a gNB configures a 15 kHz subcarrier spacing and if the gNB configures a (4,3) pattern with the DCI not actually having a length of three (3), then the gNB has configured a search space pattern that satisfies both (4,3) and (2,2). This configuration may be ambiguous for the UE because the UE does not know which configuration the gNB utilized. If the gNB utilized the (4,3) pattern set, then the UE is supposed to choose a monitoring limit corresponding to a (7,3) pattern. But if the gNB utilized the (2,2) pattern set, then the UE is supposed to choose a monitoring limit based on the (2,2) pattern. So, because the UE can differentiate support of sets mostly likely based on prominence, it still remains ambiguous to the UE as to what to monitor.

Figure 7:
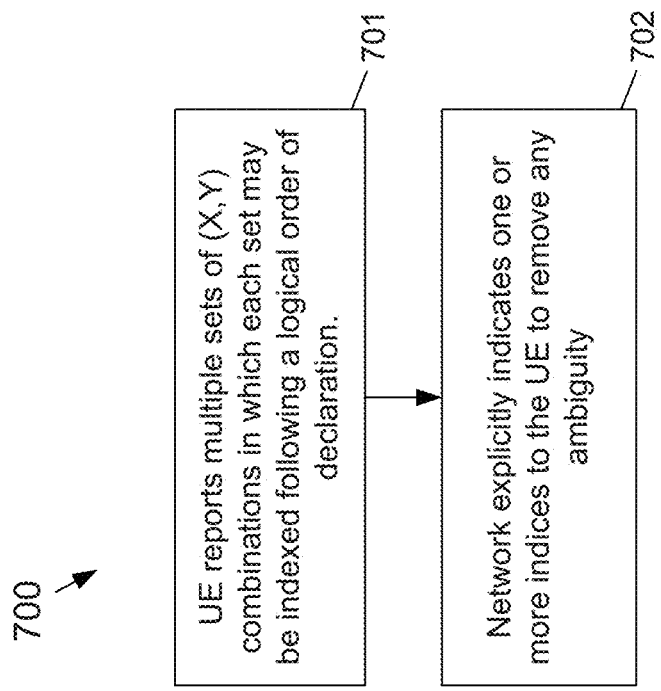
FIG. 7 is a first method to explicitly remove any ambiguity according to the subject matter disclosed herein.

To remove any ambiguity, the network may explicitly indicate the set of (X,Y) combinations to a UE. FIG. 7 is a first method 700 to explicitly remove any ambiguity according to the subject matter disclosed herein. At 701, a UE reports multiple sets of (X,Y) combinations in which each set may be indexed following a logical order of declaration. For example, if a UE reports set1={(2,2),(4,3)}, and set2={(7,3),(4,3)}, then set1 may be designated using an index of 0 and set2 may be designated using an index1. At 702, the network may explicitly indicate one or more indices to a UE to remove any ambiguity by sending the indication in one of the first three OFDM symbols in a time slot of the PDCCH. That is, the network may explicitly indicate one or more indices to the UE using the basic monitoring behavior of the UE.

Figure 8:
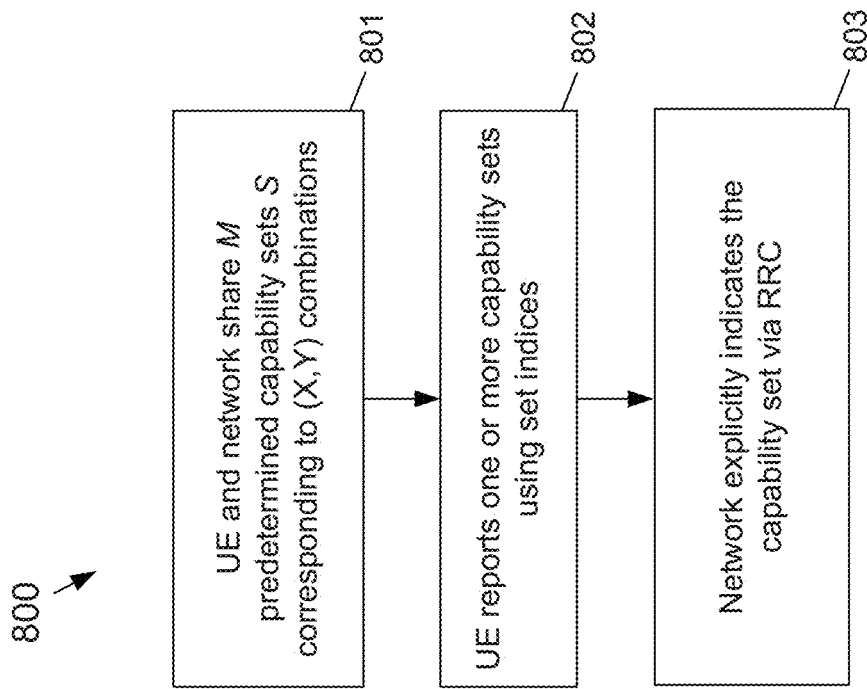
FIG. 8 is a second method to explicitly remove any ambiguity according to the subject matter disclosed herein.

FIG. 8 is a second method 800 to explicitly remove any ambiguity according to the subject matter disclosed herein. At 801, a UE and the network may share M predetermined capability sets $S_1, \ldots, S_M$ corresponding to sets of (X,Y) combinations. For example, a UE and the network may share two (M=2) predetermined capability sets $S_1$={(2,2), (4,3)} and $S_2$={(7,3),(4,3)}. At 802, the UE reports one or more capability sets using set indices m E {1, ..., M}. At 803, the network may explicitly indicate the capability set(s) utilized by the network by sending the indication in one of the first three OFDM symbols in a time slot of the PDCCH. That is, the network may explicitly indicate one or more indices to the UE using the basic monitoring behavior of the UE.

For the example methods 700 and 800, a specific set to use may be indicated by the network in, for example, one of two ways. A first way may be to use a bitmap of having a length of three (3) in which each bit respectively corresponds (7,3), (4,3), and (2,2). A bit value of 1 may mean that the corresponding (X,Y) combination is included in the set. A second way may be use an N-bit signaling technique that satisfies N≥$\log_2$M in which M is the cardinality of the sets of (X,Y) combinations. Then, each value realizable by the N bits correspond to each set of (X,Y) combinations. If a per-FS basis is utilized by a UE for reporting supported (X,Y) combinations, then a single set of (X,Y) combinations may be applied for all component carriers in each band. Hence, an explicit indication of the specific set for the UE to use may either be included in one of component carriers in the same band or in multiple component carriers in the same band while having the same value of indication for the set of (X,Y) combinations.

In other embodiments, a UE may implicitly determine the set to be utilized based on certain predetermined rules. One example mechanism may be that a UE may have a certain structure for reporting of multiple sets of (X,Y) combinations. For example, a UE may not be allowed to report multiple featuresets in a band in a BC in which only sets of (X,Y) combinations are different among those featuresets, i.e., all other parameters in those featuresets are identical. In another example mechanism, the network may ensure that configured parameters to a UE may clearly differentiate a specific featureset declared by a UE. For example, if multiple featuresets in a band in a BC have only one parameter that is different among the multiple featuresets, then the network should ensure that such parameter is configured in a way that a specific featureset may be determined by a UE.

Figure 9:
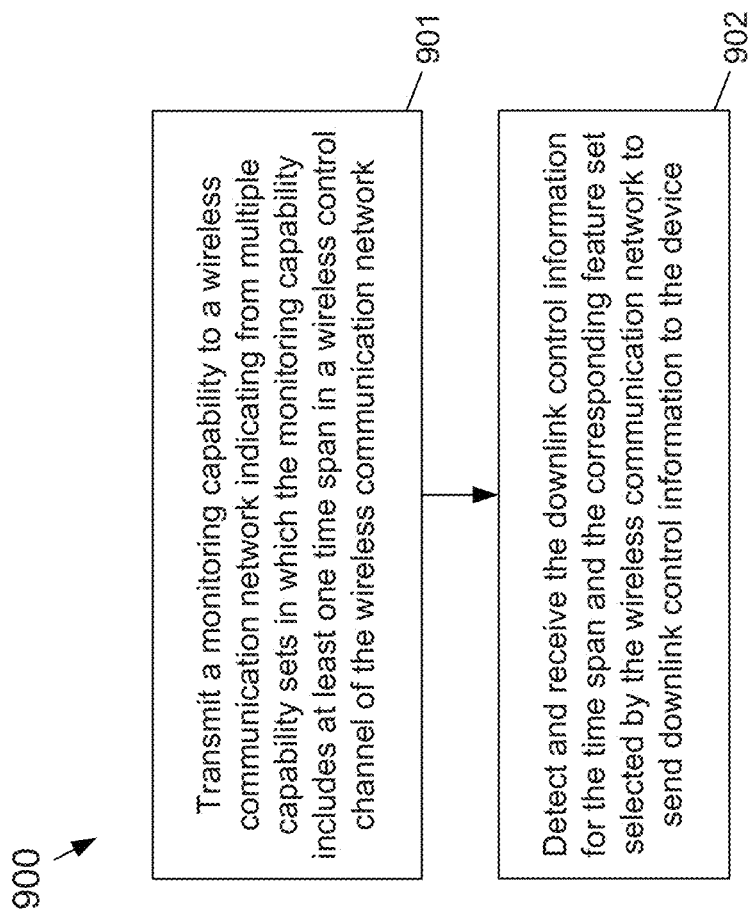
FIG. 9 is a flow diagram of an example embodiment of a method that may be performed by a UE to receive downlink control information over a wireless downlink control channel of a wireless communication network according to the subject matter disclosed herein.

FIG. 9 is a flow diagram of an example embodiment of a method 900 that may be performed by a device, such as a UE, to receive downlink control information over a wireless downlink control channel of a wireless communication network according to the subject matter disclosed herein. In one embodiment, the device may be the UE 116 depicted in FIG. 3. Alternatively, the device may be one of the UEs 111-115 that are depicted in FIG. 1. At 901, the device transmits a monitoring capability of the device to the wireless communication network to which the device is connected. In one embodiment, the wireless communication network may be the wireless communication network 100 depicted in FIG. 1 and, more specifically, the device may transmit the device monitoring capability to a base station, such as base station 102 in FIG. 1.

The monitoring capability transmitted by the device to the wireless communication network relates to a time slot of the wireless downlink control channel of the wireless communication network, and may be indicated from multiple capability sets. In one embodiment, the monitoring capability may include at least one (X,Y) pattern in a time slot in a wireless downlink control channel of the wireless communication network in which the time slot comprises multiple spans, X comprises a minimum time separation of symbols of two spans of the time slot and Y comprises a maximum number of consecutive symbols for each span of the time slot. In yet another embodiment, the monitoring capability may be for monitoring capability of the device is for ultra-reliable low-latency communications (URLLC) and may be reported based on a per-feature set (per-FS) basis or a per-feature set per component carrier (per-FSPC) basis.

In one embodiment, the network sends an indication of which time span and feature set have been selected in one of the first three OFDM symbols in a time slot of the PDCCH. That is, the network may indicate one or more indices to the UE using the basic monitoring behavior of the UE.

At 902, the device detects and receives the downlink control information for the time span and the corresponding feature set selected by the wireless communication network to send downlink control information to the device. In one embodiment, the device detects and receives the downlink control information based on an explicit indication of the time span and the corresponding feature set selected by the wireless communication network via a radio resource link of the wireless communication network. The indices may be assigned by either the device or the wireless communication network. In another embodiment, an index may be used that corresponds to each respective capability set of the multiple capability sets, and the monitoring capability of the device that was transmitted by the device to the wireless communication network may include the index for each capability set that the device is capable of monitoring. For this alternative embodiment, the device may receive from the wireless communication network an explicit indication of the index for each time span and corresponding feature set selected by the wireless communication network. In yet another embodiment, each feature set corresponding to each time span of the monitoring capability indicated by the device may include a corresponding feature having a supported value that is different from the supported value of the aforementioned feature included in a feature set corresponding to another time span that has been indicated by the monitoring capability of the device so that the indication may be differentiable to the UE.

Yet another way for a UE to implicitly determine the set to be utilized is to use a set of (X,Y)s including a set (X,Y) that is associated with the largest maximum number of $C_{PDCCH}^{max,(X,Y),\mu}$ and $M_{PDCCH}^{max,(X,Y),\mu}$ among (X,Y)s satisfying the configuration. This method actually may not fully resolve all ambiguity on the set of (X,Y)s because there still may be multiple such sets that satisfy the configuration. In the current 5G specification, however, such ambiguity does not affect operation because the end result will all be the same for all such sets. The UE will eventually choose the aforementioned (X, Y) associated with the largest maximum number of $C_{PDCCH}^{max,(X,Y),\mu}$ and $M_{PDCCH}^{max,(X,Y),\mu}$ among (X,Y)s satisfying the configuration.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A device, comprising:
   a transceiver coupled to a wireless communication network; and
   a processing device coupled to the transceiver, the processing device being configured to:
   control the transceiver to transmit to the wireless communication network a monitoring capability of the device, the monitoring capability being indicated from multiple capability sets, and each capability set comprising at least one (X,Y) pattern in a time slot in a wireless downlink control channel of the wireless communication network in which the time slot comprises multiple spans, X comprises a minimum time separation of symbols of two spans of the time slot and Y comprises a maximum number of consecutive symbols for each span of the time slot, and
   control the transceiver to receive downlink control information based on a capability set selected by the wireless communication network to send downlink control information to the device.

2. The device of claim 1, wherein controlling the transceiver to receive downlink control information further comprises controlling the transceiver to receive an explicit indication of which capability set has been selected by the wireless communication network to send downlink control information to the device.

3. The device of claim 2, wherein the multiple capability sets comprise predetermined capability sets shared by the device and the wireless communication network prior to the device transmitting the monitoring capability of the device to the wireless communication network,
   wherein an index corresponds to each respective capability set of the multiple capability sets, and
   wherein controlling the transceiver to receive the explicit indication of which capability set has been selected further comprises controlling the transceiver to receive an index that corresponds to the capability set has been selected by the wireless communication network to send downlink control information to the device.

4. The device of claim 1, wherein a bit position in a bit map corresponds to a respective (X,Y) pattern, and
   wherein controlling the transceiver further comprises controlling the transceiver to receive an explicit indication of which capability set has been selected by receiving a bit map comprising an indication of the selected (X,Y) pattern.

5. The device of claim 1, wherein the monitoring capability of the device comprises a plurality of capability sets in which each capability set indicated by the device further comprises a feature that makes the capability set distinguishable from other capability sets indicated by the device, and
wherein controlling the transceiver to receive the downlink control information further comprises controlling the transceiver to receive an indication of the capability set has been selected by the wireless communication network, the capability set selected by the wireless communication network comprising a feature that makes the capability set distinguishable from other capability sets indicated by the device.

6. The device of claim 1, wherein the monitoring capability of the device comprises a set of (X,Y)s that includes a set (X,Y) that is associated with a largest maximum number of $C_{PDCCH}^{max,(X,Y),\mu}$ and $M_{PDCCH}^{max,(X,Y),\mu}$ among the set of (X,Y)s.

7. The device of claim 1, wherein the device comprises a user equipment, and the wireless communication network comprises a Fifth Generation (5G) wireless communication network,
wherein the monitoring capability comprises one of a capability on a per-feature set (per-FS) basis and on a per-feature set per component carrier (per-FSPC) basis, and
wherein the monitoring capability of the device is for ultra-reliable low-latency communications (URLLC).

8. A base station in a wireless communications network, the base station comprising:
a first transceiver; and
a first processing device coupled to the first transceiver, the first processing device being configured to:
control the first transceiver to receive from the wireless communication network a monitoring capability of a device wirelessly coupled to the wireless communication network, the monitoring capability of the device being indicated from multiple capability sets, and each capability set comprising at least one (X,Y) pattern in a time slot in a wireless downlink control channel of the wireless communication network in which the time slot comprises multiple spans, X comprises a minimum time separation of symbols of two spans of the time slot and Y comprises a maximum number of consecutive symbols for each span of the time slot, and
control the first transceiver to send an indication to the device, the indication comprising a capability set selected from the monitoring capability of the device.

9. The base station of claim 8, wherein the first processing device is further configured to control the first transceiver to send to the device an explicit indication of the capability set selected by the wireless communication network.

10. The base station of claim 9, wherein the capability sets comprise predetermined capability sets shared by the device and the wireless communication network prior to the device transmitting the monitoring capability of the device to the wireless communication network,
wherein an index corresponds to each respective capability set of the multiple capability sets, and
wherein controlling the first transceiver to send the explicit indication of the capability set has been selected further comprises controlling the first transceiver to send an index that corresponds to the capability set has been selected by the wireless communication network to send downlink control information to the device.

11. The base station of claim 9, wherein a bit position in a bit map corresponds to a respective (X,Y) pattern, and
wherein controlling the first transceiver to send the explicit indication of the capability set has been selected further comprises controlling the first transceiver to send the bit map in which the (X,Y) pattern selected by the wireless communication network is explicitly indicated.

12. The base station of claim 8, wherein the monitoring capability of the device comprises a plurality of capability sets in which each capability set indicated by the device further comprises a feature that makes the capability set distinguishable from other capability sets indicated by the device, and
wherein the indication sent to the device indicates the capability set has been selected by the wireless communication network, the capability set selected by the wireless communication network comprising a feature that makes the capability set distinguishable from other capability sets indicated by the device.

13. The base station of claim 8, wherein the monitoring capability of the device comprises a set of (X,Y)s that includes a set (X,Y) that is associated with a largest maximum number of $C_{PDCCH}^{max,(X,Y),\mu}$ and $M_{PDCCH}^{max,(X,Y),\mu}$ among the set of (X,Y)s.

14. The base station of claim 8, wherein the device comprises a user equipment, and the wireless communication network comprises a Fifth Generation (5G) wireless communication network,
wherein the monitoring capability comprises one of a capability on a per-feature set (per-FS) basis and on a per-feature set per component carrier (per-FSPC) basis, and
wherein the monitoring capability of the device is for ultra-reliable low-latency communications (URLLC).

15. The base station of claim 8, further comprising the device, the device comprising:
a second transceiver coupled to a wireless communication network; and
a second processing device coupled to the second transceiver, the second processing device being configured to:
control the second transceiver to transmit to the wireless communication network the monitoring capability of the device, and
control the second transceiver to receive downlink control information based on the capability set selected by the wireless communication network to send downlink control information to the device.

16. A method to receive downlink control information over a wireless downlink control channel of a wireless communication network, the method comprising:
transmitting, from a device to the wireless communication network, a monitoring capability of the device, the monitoring capability being indicated from multiple capability sets, and each capability set comprising at least one (X,Y) pattern in a time slot in a wireless downlink control channel of the wireless communication network in which the time slot comprises multiple spans, X comprises a minimum time separation of symbols of two spans of the time slot and Y comprises a maximum number of consecutive symbols for each span of the time slot; and receiving, by the device, downlink control information based on a capability set selected by the wireless communication network to send downlink control information to the device.

17. The method of claim 16, further comprising monitoring, by the device, the wireless downlink control channel to receive an explicit indication of which capability set has been selected by the wireless communication network to send downlink control information to the device.

18. The method of claim 17, wherein the multiple capability sets comprise predetermined capability sets shared by the device and the wireless communication network prior to the device transmitting the monitoring capability of the device to the wireless communication network,
  wherein an index corresponds to each respective capability set of the multiple capability sets, and
  wherein receiving the explicit indication of which capability set has been selected comprises receiving an index that corresponds to the capability set has been selected by the wireless communication network to send downlink control information to the device.

19. The method of claim 17, wherein a bit position in a bit map corresponds to a respective (X,Y) pattern, and
  wherein receiving the explicit indication of which capability set has been selected comprises receiving the bit map explicitly indicating a selected (X,Y) pattern.

20. The method of claim 16, wherein the monitoring capability indicated by the device comprises multiple capability sets in which each capability set indicated by the device comprises a feature set that is distinguishable from feature sets of other capability sets indicated by the device.

21. The method of claim 16, wherein the monitoring capability of the device comprises a plurality of capability sets in which each capability set indicated by the device further comprises a feature that makes the capability set distinguishable from other capability sets indicated by the device, and
  wherein receiving the downlink control information further comprises receiving an indication of the capability set that has been selected by the wireless communication network, the capability set selected by the wireless communication network comprising a feature that makes the capability set distinguishable from other capability sets indicated by the device.

22. The method of claim 16, wherein the monitoring capability of the device comprises a set of (X,Y)s that includes a set (X,Y) that is associated with a largest maximum number of $C_{PDCCH}^{max,(X,Y),\mu}$ and $M_{PDCCH}^{max,(X,Y),\mu}$ among the set of (X,Y)s.

23. The method of claim 16, wherein the device comprises a user equipment, and the wireless communication network comprises a Fifth Generation (5G) wireless communication network,
  wherein the monitoring capability comprises one of a capability on a per-feature set (per-FS) basis and on a per-feature set per component carrier (per-FSPC) basis, and
  wherein the monitoring capability of the device is for ultra-reliable low-latency communications (URLLC).

* * * * *